(12) United States Patent
Kiyooka et al.

(10) Patent No.: US 11,207,978 B2
(45) Date of Patent: Dec. 28, 2021

(54) TRANSAXLE

(71) Applicant: Kanzaki Kokyukoki Mfg. Co., Ltd., Amagasaki (JP)

(72) Inventors: Koji Kiyooka, Amagasaki (JP); Michio Tsukamoto, Amagasaki (JP)

(73) Assignee: Kanzaki Kokyukoki Mfg. Co., Ltd., Amagasaki (JP)

( * ) Notice: Subject to any disclaimer, the term of this patent is extended or adjusted under 35 U.S.C. 154(b) by 0 days.

(21) Appl. No.: 17/121,234

(22) Filed: Dec. 14, 2020

(65) Prior Publication Data

US 2021/0122236 A1 Apr. 29, 2021

Related U.S. Application Data

(63) Continuation-in-part of application No. 16/363,535, filed on Mar. 25, 2019, now Pat. No. 10,871,178, which is a continuation-in-part of application No. 15/947,137, filed on Apr. 6, 2018, now Pat. No. 10,711,887, which is a continuation-in-part of application No. 14/738,410, filed on Jun. 12, 2015, now Pat. No. 9,964,126.

(51) Int. Cl.
*B60K 17/10* (2006.01)
*F16H 63/34* (2006.01)

(52) U.S. Cl.
CPC ....... *B60K 17/105* (2013.01); *F16H 63/3433* (2013.01)

(58) Field of Classification Search
CPC ...... F15B 15/02; F16H 63/3416; F16H 39/10; F16H 63/3433; A01D 69/10; B60T 1/062; B60K 17/04; B60K 7/0015; B60K 17/105
See application file for complete search history.

(56) References Cited

U.S. PATENT DOCUMENTS

| | | | |
|---|---|---|---|
| 6,434,917 B1 | 8/2002 | Bartel | |
| 6,708,805 B2 | 3/2004 | Samejima et al. | |
| 7,954,907 B1* | 6/2011 | Wieber | B60T 1/062 303/3 |
| 8,205,708 B2* | 6/2012 | Sakakura | B62D 11/001 180/305 |
| 8,240,414 B2* | 8/2012 | Sasahara | A01D 34/78 180/65.31 |
| 2009/0301076 A1* | 12/2009 | Yasuda | B60K 17/105 60/491 |

(Continued)

*Primary Examiner* — Abiy Teka
(74) *Attorney, Agent, or Firm* — Sterne, Kessler, Goldstein & Fox P.L.L.C.

(57) ABSTRACT

A transaxle with a brake includes an axle supported by the transaxle casing, a continuously variable transmission disposed in the transaxle casing, a braking device that is disposed in the transaxle casing and locks a rotation of the axle, a speed control arm that is journaled so as not to rotate relatively with respect to the transmission operating shaft of the transmission, controls the transmission, and is capable of changing a rotation of the axle continuously. A brake arm that is journaled with respect to an operating shaft of the braking device and a relay arm that is journaled so as to be relatively rotatable with respect to the transmission operating shaft are also included. The relay arm has one end connected to the brake arm via a link mechanism and the other end for lock operation input.

6 Claims, 28 Drawing Sheets

(56) References Cited

U.S. PATENT DOCUMENTS

2014/0223898 A1* 8/2014 Iida ..................... B60K 17/105
 60/491
2015/0007555 A1* 1/2015 Saldierna ............ F16H 61/0003
 60/419

* cited by examiner

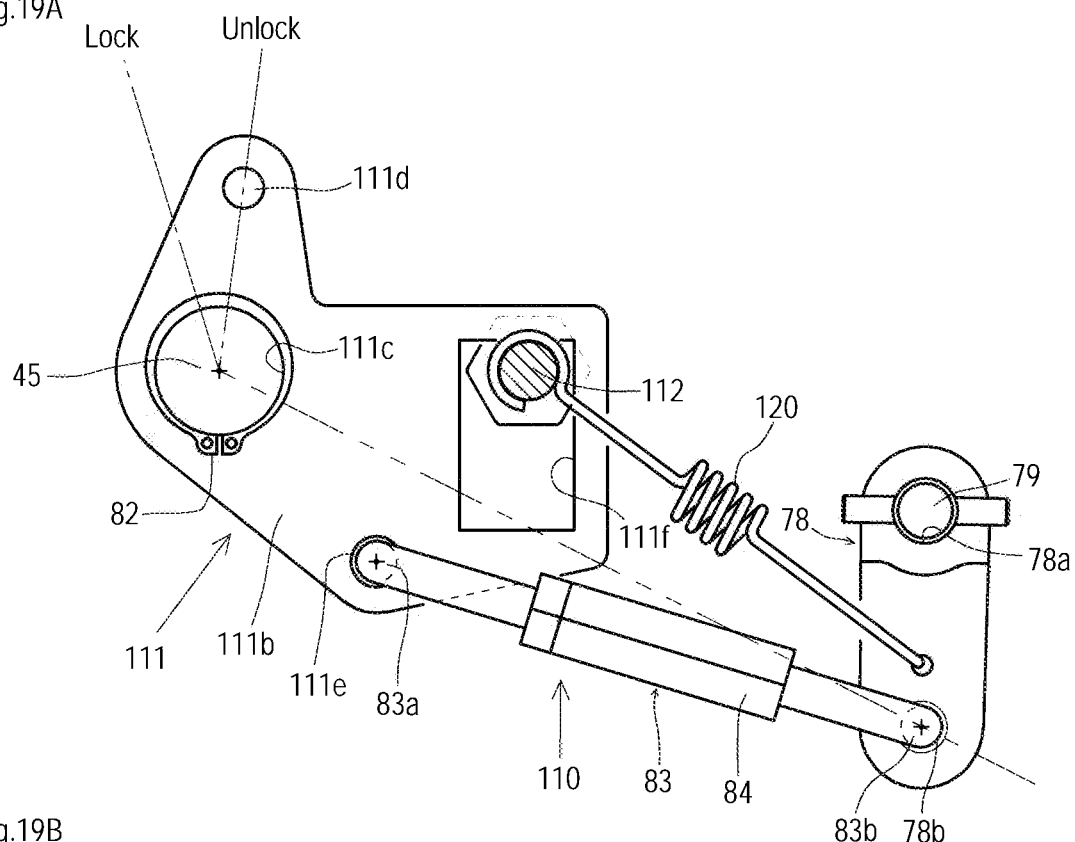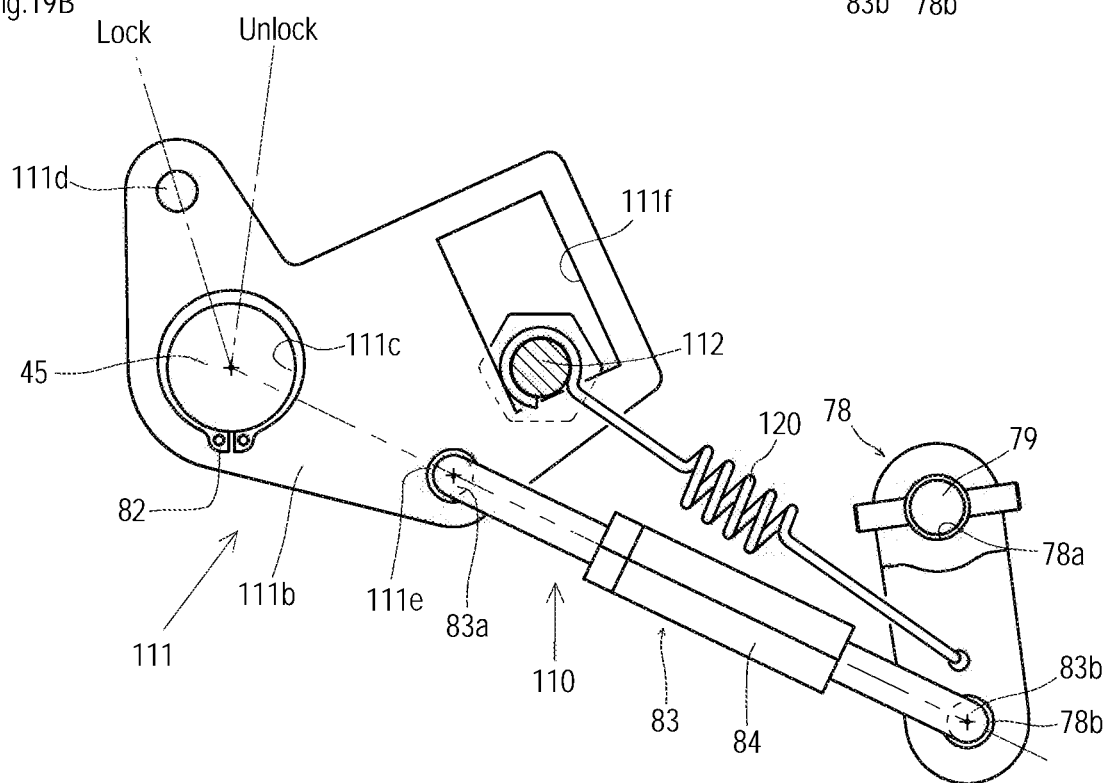

TRANSAXLE

CROSS-REFERENCE TO RELATED APPLICATION

This application is a continuation-in-part application based on U.S. patent application Ser. No. 16/363,535 filed on Mar. 25, 2019, which is a continuation-in-part of U.S. patent application Ser. No. 15/947,137 filed on Apr. 6, 2018, which is a continuation-in-part of U.S. patent application Ser. No. 14/738,410 filed on Jun. 12, 2015.

BACKGROUND

Technical Field

The disclosure relates to a transaxle including a hydrostatic transmission (hereinafter, "HST"), an axle driven by the HST, a transaxle connected to a control lever for operating the HST, and a vehicle including the transaxle. The disclosure relates particularly to the transaxle including a mechanism that automatically returns the control lever to a neutral position. Specifically, this transaxle includes a parking brake mechanism that mechanically keeps the parking state of a vehicle.

Related Art

Conventionally, as disclosed in U.S. 2015/0007555 A1, there is a well-known hydraulic transaxle that serves as each of right and left transaxles carrying respective right and left axles of a zero-turn vehicle, e.g., a lawn mower. The transaxle includes an HST, an axle and a reduction gear train transmitting power from the HST to the axle. The HST includes a hydraulic pump for receiving power from a prime mover, a hydraulic motor for outputting power to the reduction gear train, and a center section. The hydraulic pump and motor are mounted on the center section and are fluidly connected to each other via fluid passages formed in the center section. The transaxle is connected to the control lever for operating the HST, and configured to be able to switch forward and backward movements of the vehicle or perform an acceleration or deceleration operation by rotating the control lever.

The transaxle includes a gear locking mechanism, as a parking brake mechanism of the vehicle, configured to retain a gear that constitutes a reduction gear train such that the gear locking mechanism retains the gear of the reduction gear train with a retaining pawl to brake the axle.

A vehicle including such a transaxle includes a brake operating mechanism including an operating tool for operating a brake arm and a lock shaft, and a link member connecting the operating tool and the brake arm. By operating the link member in response to the operation of the operating tool, the brake arm and the lock shaft rotate with respect to the transaxle casing.

As described above, with respect to the position of the brake arm with respect to the lock shaft, either the left end or the right end of the lock shaft is selected. That is, in a vehicle including the transaxle, the link member and the brake arm can be disposed after selecting either the proximal end or the distal end of the transaxle casing. However, other components of the vehicle are often disposed on the proximal side of the transaxle casing, and according to the disposition, when the brake arm and link member are disposed on the proximal side of the transaxle casing, there is a possibility that a component other than the transaxle and the link member may interfere with each other. Therefore, in the transaxle including a brake, a configuration for avoiding interference between another component and the link member is desired. Further, it is preferable that the above-mentioned interference avoidance mechanism can be applied even when the vehicle is equipped with either the left and right manipulation levers or a single lock pedal.

SUMMARY

A further object of the present disclosure is to provide a transaxle including a braking unit, in which when the axle is locked by the braking device, the transaxle is capable of forcibly moving a transmission to a neutral position easily by using the above-mentioned interference avoidance mechanism.

In order to achieve the object, a transaxle with a brake of the present disclosure includes a transaxle casing, an axle supported by the transaxle casing, a continuously variable transmission disposed in the transaxle casing, a braking device that is disposed in the transaxle casing and locks a rotation of the axle, a speed control arm that is journaled so as not to rotate relatively with respect to the transmission operating shaft of the transmission, controls the transmission, and is capable of changing a rotation of the axle continuously, a brake arm that is journaled with respect to an operating shaft of the braking device, and a relay arm that is journaled so as to be relatively rotatable with respect to the transmission operating shaft, wherein the relay arm has one end connected to the brake arm via a link mechanism and the other end for lock operation input.

With such a configuration, the brake arm can be rotated via the relay arm to lock the axle. That is, the speed control arm can be moved to the neutral position, and the axle can be further locked by the braking device.

Preferably, a vehicle on which the transaxle with a brake is mounted includes a pair of left and right manipulation lever devices, wherein each of the manipulation lever devices includes a transmission manipulation unit that is capable of moving in a front-rear direction to determine a stop of the axle and a traveling direction/a speed and a lock operation unit that is capable of moving left and right to lock and unlock the axle when the manipulation lever device is in a neutral position, and wherein the speed control arm is connected to the transmission manipulation unit, and the relay arm is connected to the lock operation unit.

With such a configuration, the manipulation lever device can determine a stop of the axle and a traveling direction/a speed in conjunction with the transmission, and can lock or unlock the axle when the manipulation lever device is in the neutral position, so that parts can be omitted without the need for additional devices such as a brake operating lever and a pedal.

Preferably, a vehicle on which the transaxle with a brake is mounted includes a pair of left and right manipulation lever devices and a single lock pedal device, wherein the speed control lever is connected to the manipulation lever device and the relay arm is connected to the lock pedal device.

With such a configuration, it is possible to stop the axle, change the traveling direction/speed, and lock the axle by operating the lock pedal device.

In addition, in order to achieve the object, a transaxle includes a transaxle casing, an axle supported by the transaxle casing, a transmission disposed in the transaxle casing, a braking device that is disposed in the transaxle casing and is capable of locking the axle, an operation unit that controls the transmission, a transmission operating shaft that controls the transmission and is capable of changing driving and stopping of the axle, a brake arm of the braking device, the brake arm being capable of changing locking/unlocking of the axle, a relay arm that is journalled so as to be relatively rotatable on the transmission operating shaft, wherein the relay arm has one end connected to the brake arm via a link mechanism and the other end connected to the operation unit via a link mechanism, and a speed control interlocking arm that is journalled with respect to the transmission operating shaft so as to be juxtaposed with the relay arm, wherein when the relay arm moves in a direction of locking the axle, a force based on the movement is transmitted to the speed control interlocking arm, thus the speed control interlocking arm moves the transmission to a neutral position.

With such a configuration when the brake arm locks the axle, the speed control arm moves the transmission to the neutral position, so the configuration can be completed compactly on the transmission side, it is not necessary to provide a brake interlocking mechanism between the manipulation lever and the lock pedal of the vehicle, and the number of link parts is reduced.

Preferably, the brake arm includes one end and the other end with a brake shaft as a base, the speed control interlocking arm is connected to the one end of the brake arm via a brake interlocking link mechanism, and the relay arm is connected to the other end of the brake arm via a link.

With such a configuration, the speed control interlocking arm rotates in conjunction with the rotation of the relay arm, and the speed control arm rotates due to the rotation of the speed control interlocking arm. As a result, when the brake arm locks the axle, the speed control arm moves the transmission to the neutral position.

Preferably, the brake interlocking link mechanism has a lost motion hole, the speed control interlocking arm has a locking pin, and the locking pin is engaged with the lost motion hole.

With such a configuration, when the brake link mechanism moves, the lost motion hole pushes the locking pin, so that the speed control interlocking arm moves in tandem.

These and other objects, features and advantages of any systems and methods of this disclosure will appear more fully from the following detailed description with reference to attached drawings.

BRIEF DESCRIPTION OF THE DRAWINGS

FIG. 19A is a left side view of a parking brake arm installed with a return spring showing the release state of the parking brake, and FIG. 19B is a left side view of the parking brake arm installed with the return spring showing the operating state of the parking brake.

DETAILED DESCRIPTION

Figure 1:
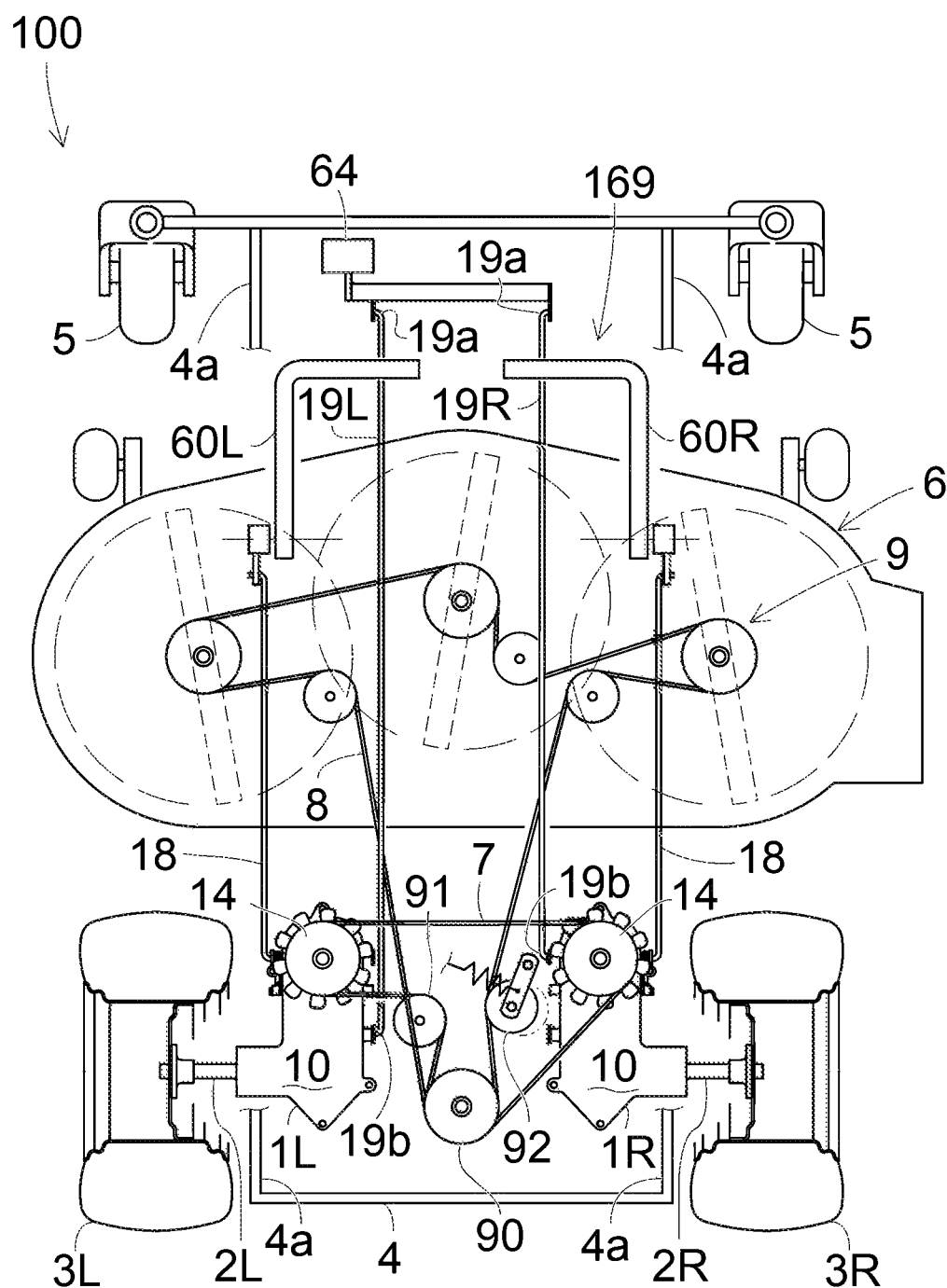
FIG. 1 is a schematic plan view of a lawn mower serving as a zero-turn vehicle equipped with right and left transaxles and right and left control levers for controlling the respective transaxles.

Referring to FIG. 1, a lawn mower (hereinafter simply referred to as "vehicle") 100 serving as a typical zero-turn vehicle is equipped with right and left transaxle 1R and 1L carrying respective right and left axles 2R and 2L, and is equipped with right and left control levers 60R and 60L for controlling respective right and left transaxles 1R and 1L. Hereinafter, all the descriptions will be given on an assumption that right and left transaxles 1R and 1L are provided therebetween with a centerline disposed at the lateral middle position of vehicle 100 and extended in the fore-and-aft direction of vehicle 100, so that the side or direction of each of transaxles 1R and 1L close to the centerline is referred to as "proximal", and the side or direction of each of transaxles 1R and 1L opposite or away from the centerline is referred to as "distal". Therefore, right transaxle 1R has its left side as its proximal side, and has its right side as its distal side, and left transaxle 1L has its right side as its proximal side, and has its left side as its distal side.

Vehicle 100 includes a vehicle body frame 4 having right and left parallel sideboards 4a extended in the fore-and-aft horizontal direction thereof. Vehicle body frame 4 supports right and left transaxles 1R and 1L so that transaxle casings 10 of right and left transaxles 1R and 1L are disposed in the inside of vehicle body frame 4, i.e., between right and left sideboards 4a when viewed in plan. Right axle 2R is extended rightward from transaxle casing 10 of right transaxle 1R to the outside of right sideboard 4a of vehicle body frame 4 so as to be fixed at a distal end thereof to right drive wheel 3R. Left axle 2L is extended leftward from transaxle casing 10 of left transaxle 1L to the outside of left sideboard 4a of vehicle body frame 4 so as to be fixed at a distal end thereof to left drive wheel 3L. Right and left transaxles 1R and 1L are disposed in vehicle 100 so as to laterally extend right and left axles 2R and 2L coaxially to each other.

Right and left drive wheels 3R and 3L serving as rear wheels of vehicle 100 are disposed on the right and left outsides of a rear portion of vehicle body frame 4. A front end portion of vehicle body frame 4 supports castors (or castor) 5 serving as front wheels (or a front wheel) of vehicle 100. A mower unit 6 is disposed below a fore-and-aft middle portion of vehicle body frame 4 between front wheels 5 and rear wheels 3R and 3L. Mower unit 6 is provided with PTO (Power Take Off) pulleys 9.

Further, vehicle 100 is equipped with an unshown prime mover, e.g., an engine, whose output power is transmitted from a double drive pulley 90 of the prime mover via a belt 7 to input pulleys 14 of respective right and left transaxles 1R and 1L. Belt 7 is looped over one pulley part of double drive pulley 90 and right and left input pulleys 14, and a tension pulley 91 applies a required tension onto belt 7.

Another belt 8 is looped over the other pulley part of double drive pulley 90 and PTO pulleys 9. Belt 8 is provided with a tension clutch pulley 92 adjacent to the proximal left side surface of right transaxle 1R. When pulley 92 is pressed against belt 8 as drawn in solid lines in FIG. 1, pulley 92 applies a tension to belt 8 so that the rotary power of drive pulley 90 is transmitted to PTO pulleys 9 via belt 8 so as to drive rotary blades of mower unit 6. When pulley 92 is rotated away from belt 8 and toward right transaxle 1R as phantom lines in FIG. 1, the tension clutch serving as pulley 92 is clutched off, so that belt 8 has no tension, whereby PTO pulleys 9 do not receive the rotary power of drive pulley 90 for driving the rotary blades of mower unit 6.

Transaxle casings 10 of right and left transaxles 1R and 1L incorporate respective parking brakes 69. Therefore, to operate parking brakes 69 of right and left transaxles 1R and 1L, vehicle 100 is provided with a parking brake control mechanism 169 that includes a parking brake pedal 64 serving as a manipulator for simultaneously shifting both parking brakes 69 of right and left transaxles 1R and 1L between an activation state and an inactivation state. Alternatively, the manipulator may be a lever or the like. Parking brake pedal 64 is located in vehicle 100 available for depression of parking brake pedal 64 by an operator's foot. By depressing parking brake pedal 64, both right and left drive wheels 3R and 3L are braked.

Brake control mechanism 169 includes right and left link rods 19R and 19L extended rearward from parking brake pedal 64 to respective transaxle casings 10 of right and left transaxles 1R and 1L. When viewed in plan, right and left link rods 19R and 19L are extended in the fore-and-aft direction of vehicle 100 in the space between right and left sideboards 4a and between transaxle casings 10 of right and left transaxles 1R and 1L, i.e., on the respective proximal sides of transaxle casings 10 of right and left transaxles 1R and 1L. Incidentally, each of right and left transaxles 1R and 1L is configured so that one of right and left sides, i.e., proximal and distal sides, of transaxle casing 10 is selective to have each link rod 19R or 19L. In other words, in the embodiment shown in FIG. 1, the proximal sides of transaxle casings 10 of right and left transaxles 1R and 1L are selected for arrangement of right and left link rods 19R and 19L.

Figure 2:
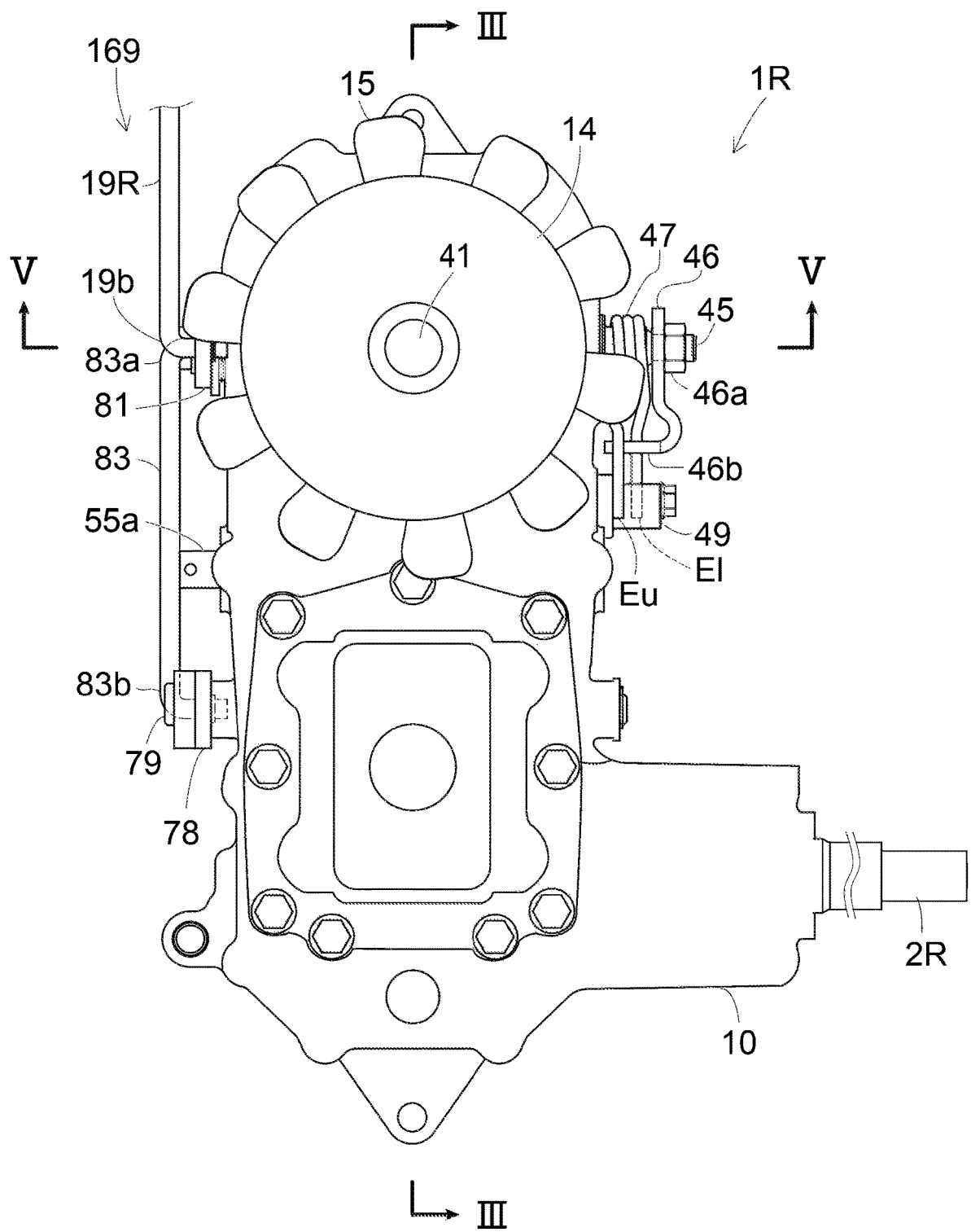
FIG. 2 is a plan view of the right transaxle serving as the transaxle according to the disclosure.

Right and left link rods 18 are extended along respective right and left sideboards 4a rearward from respective right and left control levers 60R and 60L to respective speed control arms 46 provided on distal sides of respective transaxle casings 10 of right and left transaxles 1R and 1L. When viewed in plan, right and left link rods 18 are extended in the fore-and-aft direction of vehicle 100 along respective right and left sideboards 4a. Incidentally, each of right and left transaxles 1R and 1L is configured so that one of right and left sides, i.e., proximal and distal sides, of transaxle casing 10 is selective to have speed control arm 46. In other words, in the embodiment shown in FIG. 1, the distal sides of transaxle casings 10 of right and left transaxles 1R and 1L are selected for arrangement of speed control arms 46 and right and left link rods 18. Further, as understood from FIG. 2 illustrating representative right transaxle 1R, each of right and left transaxles 1R and 1L includes a neutral returning spring 47 on the distal side of transaxle casing 10 with speed control arm 46.

Figure 3:
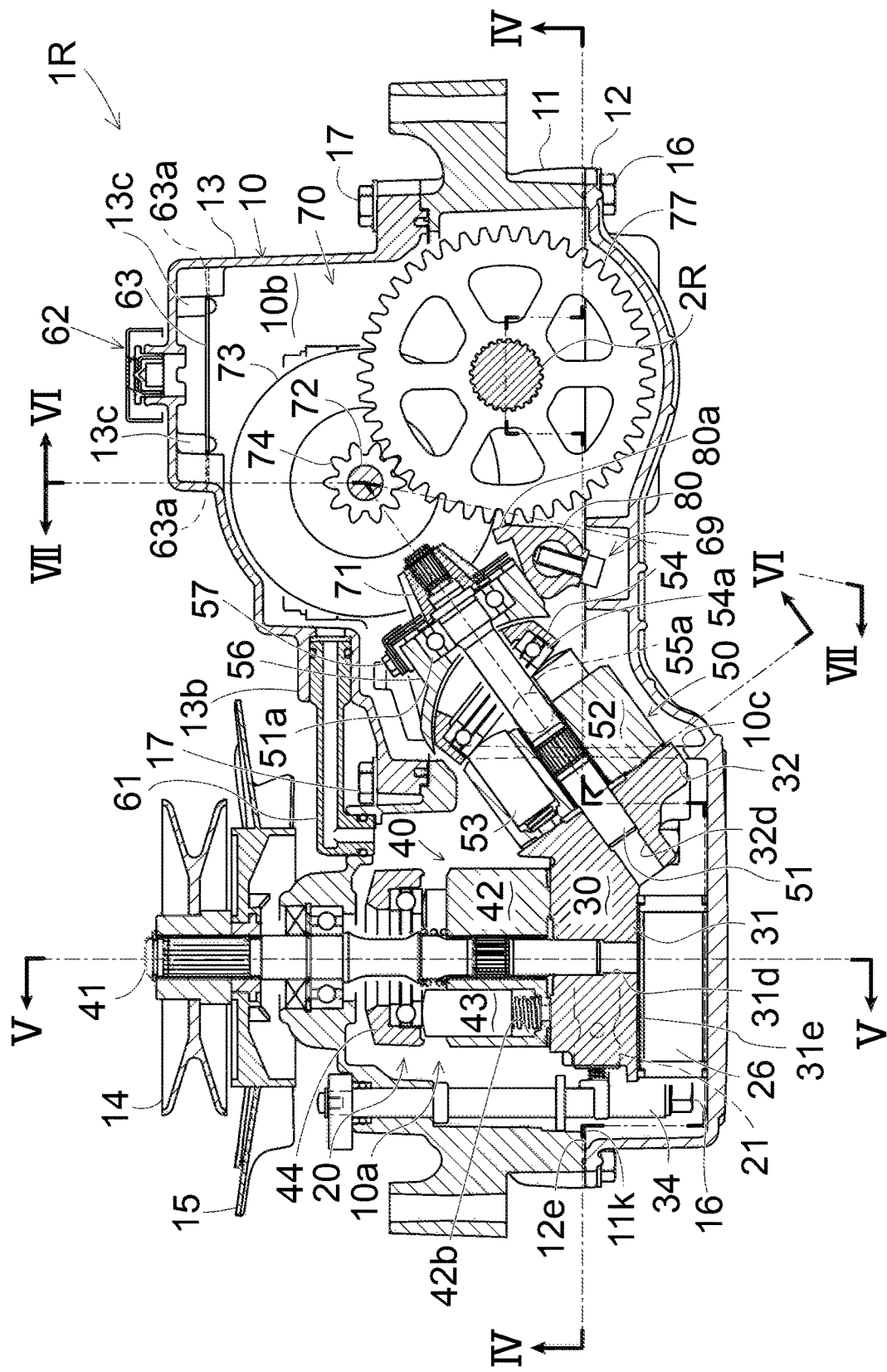
FIG. 3 is a sectional side view of the right transaxle taken along arrows of FIG. 2.

As understood from FIG. 3 illustrating representative right transaxle 1R, right control lever 60R is operable to change the tilt angle and direction of a later-discussed movable swash plate 44 of an HST 20 of right transaxle 1R so as to change the rotary speed and direction of right rear wheel 3R. Left control lever 60L is operable to change the tilt angle and direction of movable swash plate 44 of HST 20 of left transaxle 1L so as to change the rotary speed and direction of left rear wheel 3L. When right and left control levers 60R and 60L are synchronously manipulated by an operator, movable swash plates 44 of HSTs 20 of right and left transaxles 1R and 1L are synchronously controlled to change the straight travel speed of vehicle 100 in either the forward direction or the backward direction. When right and left control levers 60R and 60L are independently manipulated, movable swash plates 44 of HSTs 20 of right and left transaxles 1R and 1L are differentially controlled so as to control the turn direction, angle, and speed of vehicle 100.

Referring to FIGS. 3 to 10, representative right transaxle 1R will be described on an assumption that right and left transaxles 1R and 1L are symmetric with respect to the above-mentioned laterally middle fore-and-aft centerline drawn in vehicle 100 shown in FIG. 1. Therefore, detailed description of left transaxle 1L is omitted because it is identical or similar to right transaxle 1R, excluding a later-discussed difference of connection of left link rod 19L to left transaxle 1L from connection of right link rod 19R to right transaxle 1R.

Referring to FIG. 3, right transaxle 1 includes transaxle casing 10, HST 20 disposed in a front portion of transaxle casing 10, a right axle 2R journalled by a rear portion of transaxle casing 10, and a reduction gear train 70 disposed in the rear portion of transaxle casing 10 so as to drivingly connect HST 20 to right axle 2R.

Transaxle casing 10 includes an upper housing 11, a lower housing 12, and a top cover 13. Bolts 16 are screwed upward to fasten a flanged top edge of lower housing 12 to a bottom edge of upper housing 11 fringing a bottom opening of upper housing 11. Bolts 17 are screwed downward to fasten a flanged bottom edge of top cover 13 to a top edge of a rear half portion of upper housing 11 fringing a top opening of the rear half portion of upper housing 11. By joining upper housing 11 and lower housing 12 to each other at respective horizontal joint surfaces 11k and 12e thereof, a cavity of transaxle casing 10 is formed, and upper and lower housings 11 and 12 form a partition wall 10c that divides the cavity of transaxle casing 10 into a front HST chamber 10a and a rear gear chamber 10b.

The rear portion of upper housing 11 defining gear chamber 10b accommodates reduction gear train 70. Top cover 13 covers an upper portion of reduction gear train 70 in gear chamber 10b. The front portions of upper and lower housings 11 and 12 defining HST 10a accommodate HST 20.

HST 20 includes a center section 30, a hydraulic pump 40, and a hydraulic motor 50. Center section 30 is entirely formed by casting integrally with a horizontal pump port block portion 31, a slant motor port block portion 32, a bypass valve block portion 33, and a plurality (in this embodiment, four) of bolt boss portions 34 and 35. Motor port block portion 32 is joined to pump port block portion 31 so as to extend rearwardly upward from a rear end of pump port block portion 31. Bypass valve block portion 33 projects downward from motor port block portion 32 so as to extend in the lateral horizontal portion.

Figure 5:
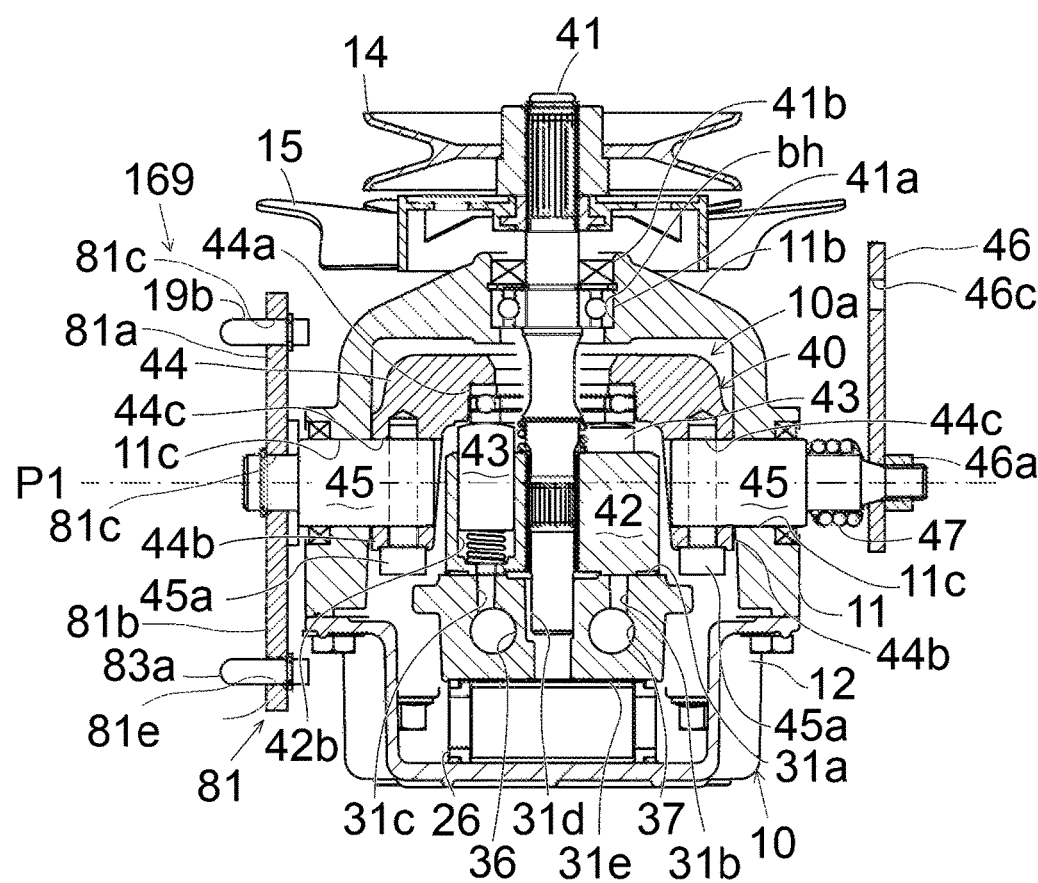
FIG. 5 is a cross sectional view taken along V-V arrows of FIG. 2.

As shown in FIG. 5, pump port block portion 31 is formed therein with right and left pump kidney ports 31b and 31c and a pump shaft hole 31d between pump kidney ports 31b and 31c. A horizontal pump mounting surface 31a is formed on a top end of pump port block portion 31. Pump kidney ports 31b and 31c and pump shaft hole 31d are extended vertically upward so as to be open at horizontal pump mounting surface 31a.

A horizontal filter mounting surface 31e is formed on a bottom end of pump port block portion 31. A circumferential area of filter mounting surface 31e is provided to contact a top edge of a cylindrical filter 26. In this regard, when HST 20 is disposed in transaxle casing 10, filter 26 contacting filter mounting surface 31e of center section 30 is submerged in a fluid sump in chamber 10a so that fluid is filtered by filter 26 when the fluid penetrates filter 26 from the fluid sump in chamber 10a to the inside space of filter 26.

Right and left main fluid passages 36 and 37 are formed in pump port block portion 31 so as to extend in the horizontal fore-and-aft direction. Referring to FIG. 3, right and left charge check valves 21 are disposed in respective front portions of right and left main fluid passages 36 and 37. Right and left suction ports 31f are open at the bottom surface of center section 30 surrounded by filter mounting surface 31e. The fluid inside of filter 26 is introduced into either hydraulically depressed main fluid passage 36 or 37 via suction port 31f and corresponding charge check valve 21, thereby being supplied as supplementary hydraulic fluid to the closed fluid circuit of HST 20.

Figure 4:
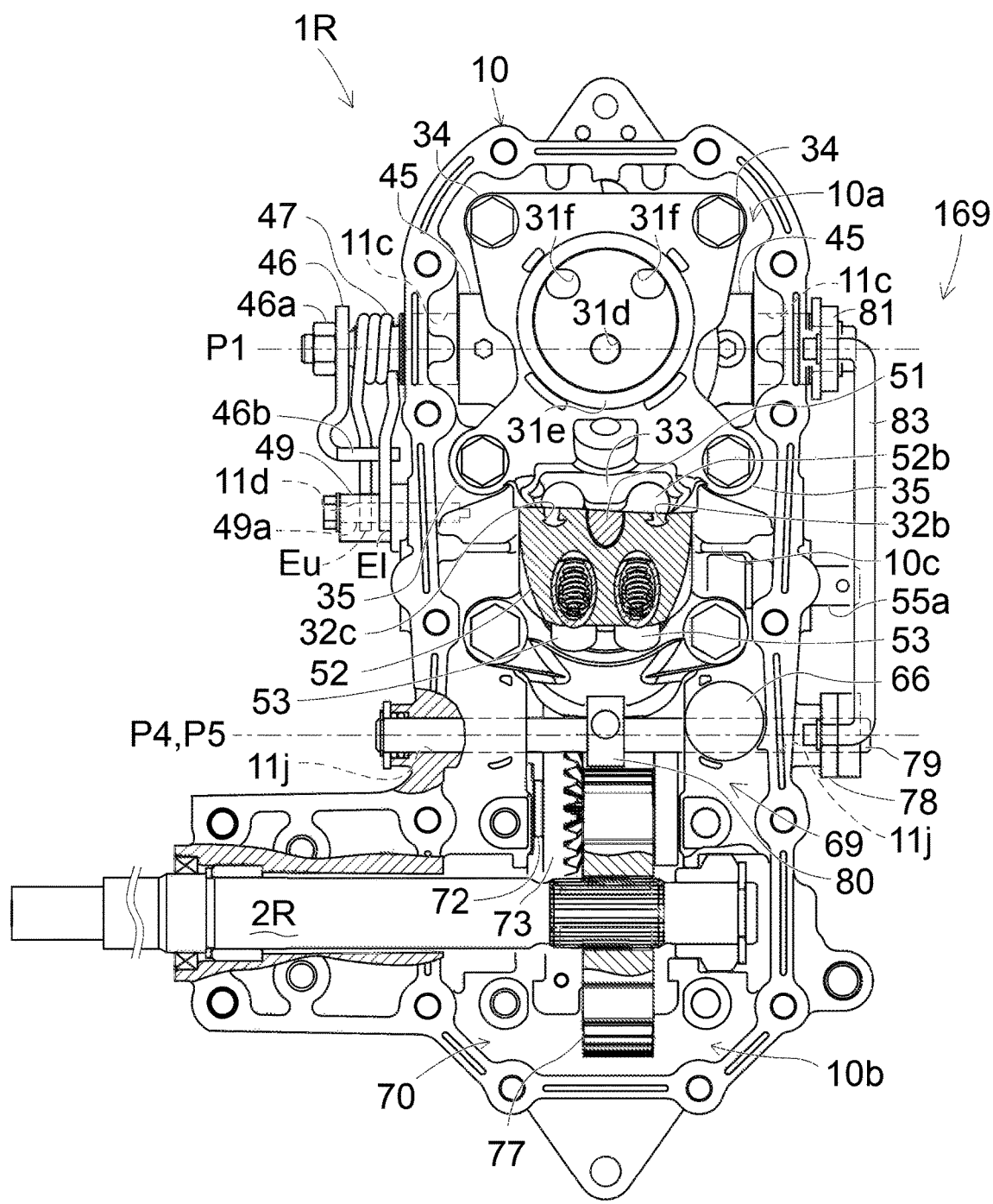
FIG. 4 is a sectional bottom view of the right transaxle taken along IV-IV arrows of FIG. 3.

Referring to FIG. 4, motor port block portion 32 is formed therein with right and left motor kidney ports 32b and 32c and a motor shaft hole 32d between motor kidney ports 32b and 32c. A slant upper end of motor port block portion 32 is formed as a rearwardly downward slant motor mounting surface 32a. Right and left main fluid passages 36 and 37 are extended rearward into motor port block portion 32 so as to be joined at rear ends thereof to respective right and left motor kidney ports 32b and 32c.

Referring to FIG. 5, hydraulic pump 40 includes a pump shaft 41, a pump cylinder block 42, plungers 43, and a movable swash plate 44. Pump shaft 41 is fittingly passed through pump shaft hole 31d in pump port block portion 31 of center section 30 rotatably relative to center section 30. Pump cylinder block 42 is formed with a center through hole serving as a pump shaft hole 42a and with cylinder bores 42b aligned radially around pump shaft hole 42a. Pump shaft 41 is fittingly passed through pump shaft hole 42a unrotatably relative to pump cylinder block 42. Pump cylinder block 42 is slidably rotatably fitted onto pump mounting surface 31a so as to fluidly connect cylinder bores 42b therein to pump kidney ports 31b and 31c. Plungers 43 are fitted into respective cylinder bores 42b reciprocally in the axial direction of pump shaft 41. Movable swash plate 44 has a bearing 44a abutting against heads of plungers 43 projecting from pump cylinder block 42. In this way, hydraulic pump 40 is configured as an axial piston type hydraulic pump.

A front top portion of the ceiling wall of transaxle housing 11 is formed as a pump shaft support portion 11b for supporting pump shaft 41. Upper housing 11 is formed through right and left side walls of pump support portion 11b with right and left symmetric trunnion holes 11c. Movable swash plate 44 of hydraulic pump 40 is a trunnion type movable swash plate, which is formed with right and left symmetric feet 44b having respective right and left symmetric trunnion holes 44c. Right and left fixture pins 45a fasten right and left feet 44b of movable swash plate 44 to right and left trunnion shafts 45 fitted in trunnion holes 44c.

Pump shaft support portion 11b is formed with a vertical through hole bh. An upper portion of pump shaft 41 projecting upward from pump cylinder block 42 fitted on pump mounting surface 31a of center section 30 is freely passed through movable swash plate 44 and through vertical through hole bh of pump shaft support portion 11b so as to project upward from pump shaft support portion 11b of transaxle housing 11. A bearing 41a and a fluid seal 41b are fitted in through hole bh of pump shaft support portion 11b so as to be interposed between pump shaft 41 and pump shaft support portion 11b of transaxle housing 11. Input pulley 14 and a cooling fan 15 are fixed on the upper portion of pump shaft 41 projecting upward from pump support portion 11b of transaxle housing 11.

Figure 6:
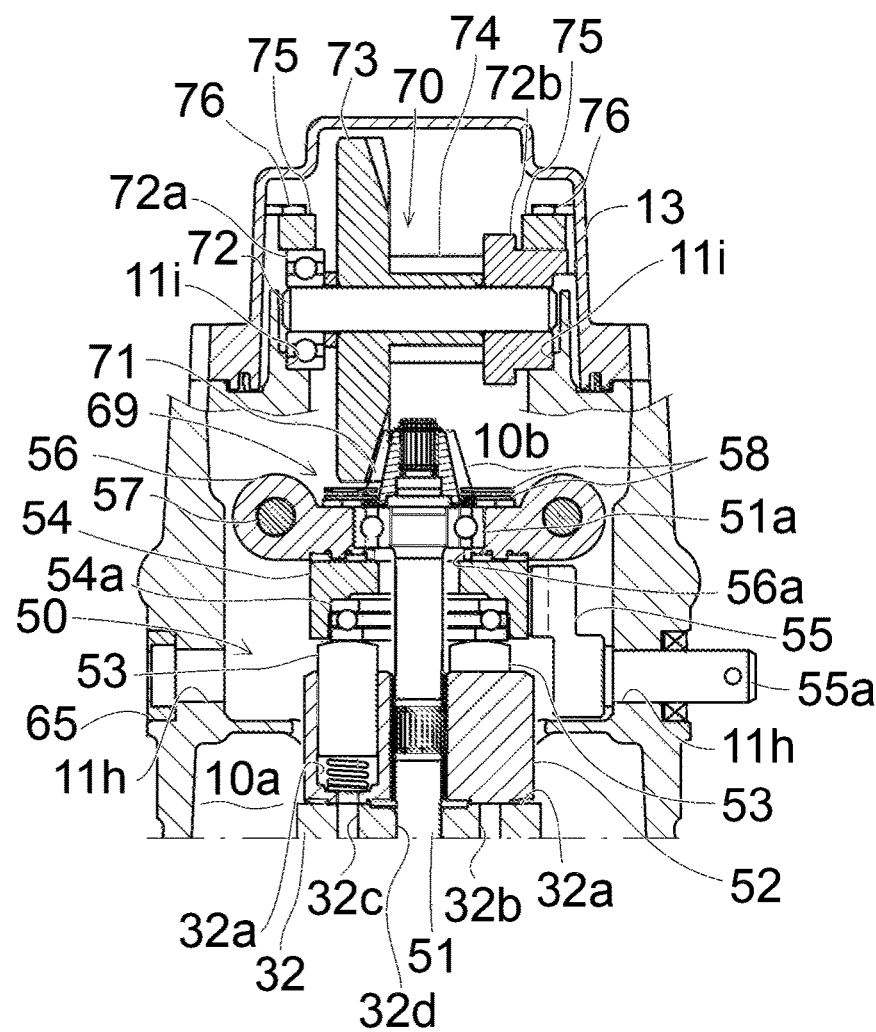
FIG. 6 is a cross sectional view taken along VI-VI arrows of FIG. 3.

Referring to FIG. 6, hydraulic motor 50 includes a motor shaft 51, a motor cylinder block 52, plungers 53, and a movable swash plate 54. Motor shaft 51 is fitted into motor shaft hole 32d in motor port block portion 32 of center section 30 rotatably relative to center section 30. Motor cylinder block 52 is formed with a center through hole serving as a motor shaft hole 52a and with cylinder bores 52b aligned radially around motor shaft hole 52a. Motor shaft 51 is fittingly passed through motor shaft hole 52a unrotatably relative to motor cylinder block 52. Motor cylinder block 52 is slidably rotatably fitted onto motor mounting surface 32a of center section 30 so as to fluidly connect cylinder bores 52b therein to motor kidney ports 32b and 32c. Cylinder bores 52b are fluidly connected to cylinder bores 42b in pump cylinder block 42 via main fluid passages 36 and 37 of the closed fluid circuit of HST 20 (see FIG. 5).

Plungers 53 are fitted into respective cylinder bores 52b reciprocally in the axial direction of motor shaft 51. A bearing abuts against heads of plungers 53 projecting from motor cylinder block 52 so as to serve as movable swash plate 54. In this way, hydraulic motor 50 is configured as an axial piston type hydraulic motor.

Referring to FIG. 3, a motor support member 56 is disposed in gear chamber 10b, and is fastened to upper housing 11 by bolts 57. Movable swash plate 54 is a cradle type movable swash plate, which is rotatably and slidably fitted to motor support member 56, and abuts against heads of plungers 53 projecting from motor cylinder block 52. Referring to FIG. 6, upper housing 11 is formed through right and left side walls of a fore-and-aft intermediate portion thereof with right and left symmetric trunnion holes 11h. Movable swash plate 54 is fixed at either a right or left end thereof to a trunnion arm 55. A trunnion shaft 55a projects horizontally from trunnion arm 55 and is fitted into one of right and left trunnion holes 11h rotatably relative to upper housing 11. Remaining trunnion hole 11h is plugged by a cap 65.

An operation lever (not shown) is fixed on a tip portion of trunnion shaft 55a projecting outward from transaxle casing 10. This operation lever for controlling movable swash plate 54 of hydraulic motor 50 can be used to adjust an output scale of transaxle 1R or 1L in correspondence to a vehicle maker's demand, or to minutely adjust the output performance of right and left transaxles 1R and 1L for keeping the ability of vehicle 100 in straight traveling when control levers 60R and 60L are operated for the straight traveling. In which direction trunnion shaft 45 projects is selected in consideration of facility in work for the above-mentioned output adjustment of transaxle 1R or 1L.

Right and left trunnion shafts 45 have respective tip portions projecting outward from the right and left side surfaces, i.e., distal and proximal side surfaces, of upper housing 11 of transaxle casing 10. Referring to FIG. 4, a speed control arm 46 is fixed on the right tip portion of right trunnion shaft 45 projecting outward from the distal right side surface of upper housing 11 so that the tilt angle and direction of movable swash plate 44 of hydraulic pump 40 is controlled by rotating speed control arm 46.

Neutral return spring 47 is wound around the tip portion of right trunnion shaft 45 between speed control arm 46 and the distal right side surface of upper housing 11 so as to have both end portions Eu and El twisted to cross each other and extended rearward. A nut 46a is screwed on the tip portion of right trunnion shaft 45 outside of speed control arm 46 so as to prevent speed control arm 46 and neutral return spring 47 from falling from right trunnion shaft 45.

Figure 10:
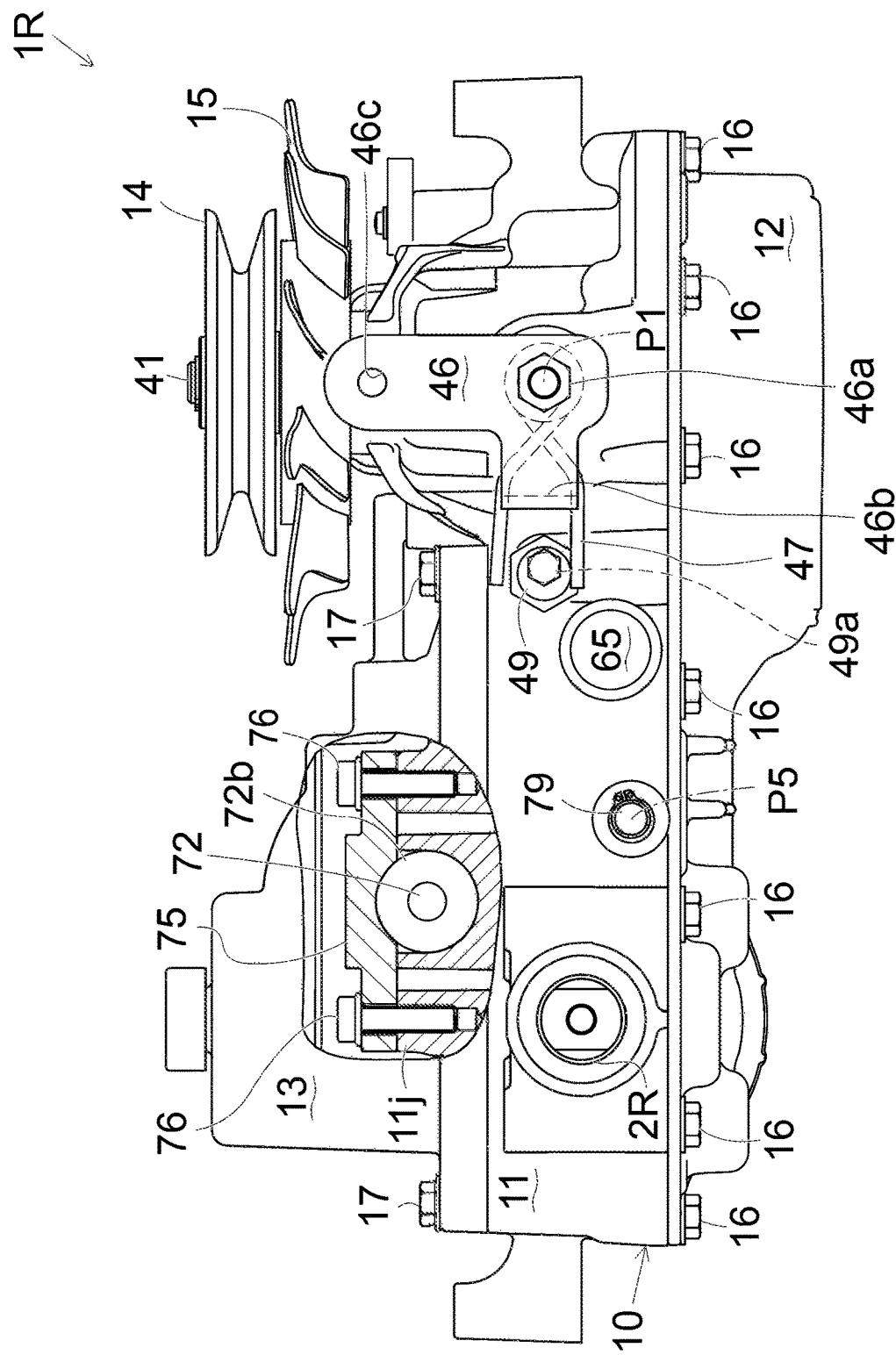
FIG. 10 is a right side view partly in section of the right transaxle.

Referring to FIG. 10, speed control arm 46 has a basal end portion attached on the right tip portion of right trunnion shaft 45, and has a tip portion formed with a later-discussed hole 46c into which a rear end portion of a later-discussed link rod 18 is fitted, so that speed control arm 46 is extended upward from the basal end thereof to the tip end thereof. Speed control arm 46 is formed with a rear branching portion that extends rearward from the basal end portion of speed control arm 46 so as to cover front halves of end portions Eu and El of neutral return spring 47 extended rearward from their mutual crossing portions. The rear branching portion is bent to have a rear end portion that is extended proximally toward the distal right side surface of upper housing 11 of transaxle casing 10 so as to serve as a pressure plate 46b. Of both end portions Eu and El of neutral return spring 47, a rear half of upper end portion Eu is extended to above pressure plate 46b, a rear half of lower end portion El is extended to below pressure plate 46b, and pressure plate 46b is disposed in halfways of rear-extended-shaped end portions Eu and El of neutral return spring 47. When speed control arm 46 is disposed at the neutral position, upper end portion Eu of neutral return spring 47 is not in contact with an eccentric pin 49 (to be described later), but lower end portion El is in contact with eccentric pin 49.

When pressure plate 46b moves upward by rotating speed control arm 46, pressure plate 46b pushes upper end portion Eu of neutral return spring 47 upward. As upper end portion Eu of neutral return spring 47 pushed by pressure plate 46b moves upward after lower end portion El of neutral return spring 47 abuts against an eccentric pin 49, the gap between upper and lower end portions Eu and El of neutral return spring 47 is expanded so that neutral return spring 47 generates a biasing force that biases upper and lower end portions Eu and El toward each other.

The right side wall of upper housing 11 of transaxle casing 10 adjacently rearward from right trunnion shaft 45 having speed control arm 46 and neutral returning spring 47 thereon is formed with an eccentric pin hole 11d, and a laterally horizontal axis shaft 49a of eccentric pin 49 is fitted into eccentric pin hole 11d. In this regard, the right and left side walls of transaxle housing 11 adjacently rearward from right and left trunnion holes 11c are formed to have sufficient thickness before boring eccentric pin hole 11d so that either the right or left wall can be selectively bored with eccentric pin hole 11d.

Figure 12:
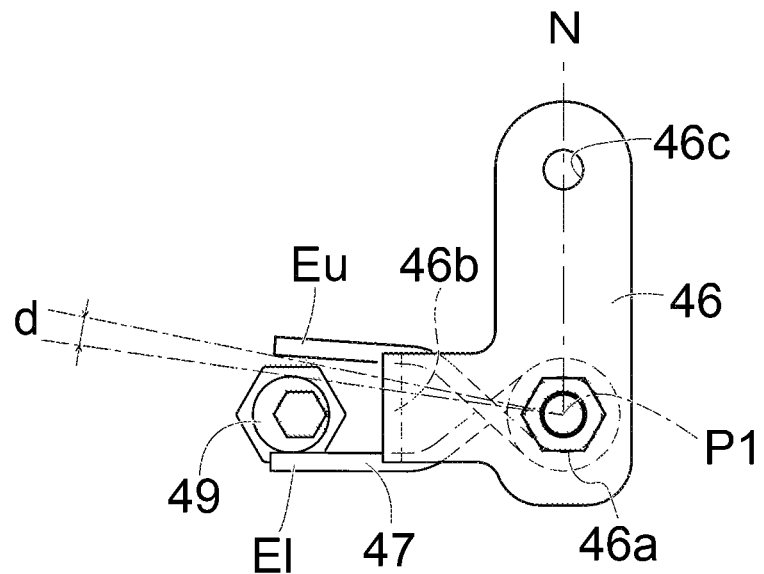
FIG. 12 is a right side view of a speed control arm of the right transaxle located at a neutral position.

Eccentric pin 49 is fitted on a portion of axis shaft 49a projecting outward from transaxle housing 11 and a nut is screwed on a distal end of axis shaft 49a so as to fasten eccentric pin 49 to axis shaft 49a. The nut is loosened to abut lower end portions El of neutral return spring 47 on eccentric pin 49 as illustrated in FIG. 12, and the nut is tightened when the rotation of eccentric pin 49 is adjusted to reach the real neutral position of movable swash plate 44 for stopping the oil discharged from hydraulic pump 40, which allows eccentric pin 49 to be fixed. In this regard, by loosening the nut, the rotational position of eccentric pin 49 pinched by neutral returning spring 47 relative to axis shaft 49a can be changed to adjust the neutral position of speed control arm 46 relative to the neutral position of movable swash plate 44.

Reduction gear train 70 disposed in gear chamber 10b will now be described.

Referring to FIG. 6, a laterally horizontal intermediate gear shaft 72 is disposed in gear chamber 10b. Upper housing 11 is formed with right and left support portions 11i that journal right and left ends of intermediate gear shaft 72. A bevel gear 73 is formed with a spur pinion 74, and is fixed on intermediate gear shaft 72. Bevel gear 73 meshes with a bevel pinion 71 fixed on an upper portion of motor shaft 51.

Referring to FIG. 4, a spur bull gear 77 is fixed on right axle 2R supported by upper housing 11 and meshes with spur pinion 74. Therefore, bevel pinion 71, bevel gear 73, spur pinion 74 and spur bull gear 77 constitute reduction gear train 70 for transmitting power from motor shaft 51 of HST 20 to right axle 2R.

Figure 7:
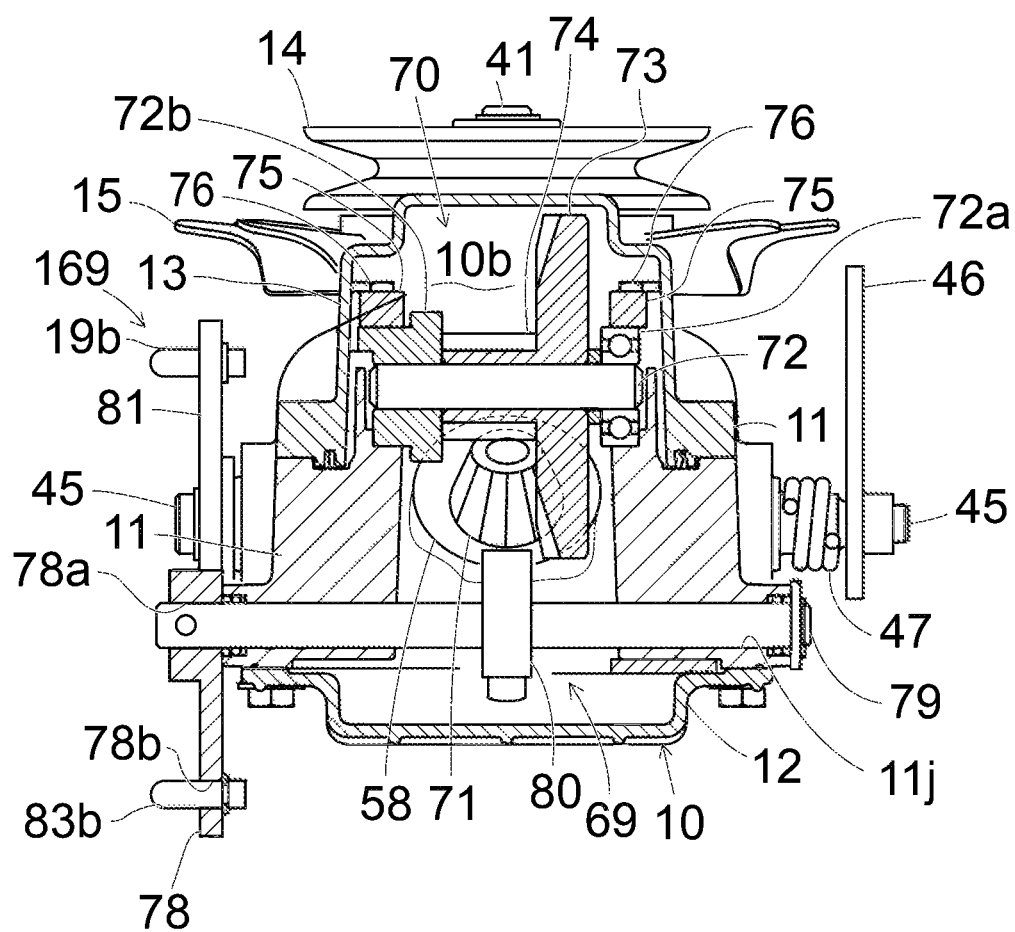
FIG. 7 is a cross sectional view taken along VII-VII arrows of FIG. 3.

Referring to FIG. 7, intermediate gear shaft 72 is pivotally supported by upper housing 11 via right and left bearings 72a and 72b fixed in respective right and left support portions 11i of upper housing 11 so as to be rotatable relative to transaxle casing 10. Referring to FIG. 10, bearing covers 75 are fastened to respective support portions 11i of upper housing 11 by bolts 76 so as to cover top portions of respective bearings 72a and 72b.

Referring to FIG. 4, a discoid magnet 66 is disposed in gear chamber 10b below a later-discussed brake operation shaft 79, and is supported by upper and lower housings 11 and 12 joined to each other so as to adsorb iron powder mixed in fluid in gear chamber 10b.

A defoaming pipe 61 is extended in the fore-and-aft horizontal direction, and is interposed between an upper portion of the front portion of upper housing 11 defining HST chamber 10a and a front portion of top cover 13 defining gear chamber 10b. A front end portion of defoaming pipe 61 is bent to extend vertically downward, and is fitted into a vertical hole of a boss 11f formed at a rear portion of pump shaft support portion 11b of upper housing 11, so that a downwardly open front end of defoaming pipe 61 is open to the upper portion of HST chamber 10a. A rear end portion of defoaming pipe 61 is fitted into a fore-and-aft horizontal hole of a boss 13b formed at a front portion of top cover 13, so that a rearwardly open rear end of defoaming pipe 61 is open to the upper portion of gear chamber 10b. Therefore, air foam rising in the fluid in HST chamber 10a is introduced into defoaming pipe 61 and is moved from HST chamber 10a to gear chamber 10b via defoaming pipe 61.

A top portion of top cover 13 is provided with a breather 62 for breathing an air space in gear chamber 10b to the atmosphere. In the upper portion of gear chamber 10b in top cover 13, a horizontal partition plate 63 is settled just below breather 62 so as to prevent fluid splashed up by the gears of reduction gear train 70 from entering breather 62. A metal plate serves as partition plate 63, for example. Partition plate 63 is formed with notches 63a at front and rear edges, and ribs 13c formed on top cover 13 to define passages for air and fluid between gear chamber 10b and breather 62 are fittingly passed through front and rear notches 63a of partition plate 63.

A parking brake 69 of right transaxle 1R will now be described.

Figure 8:
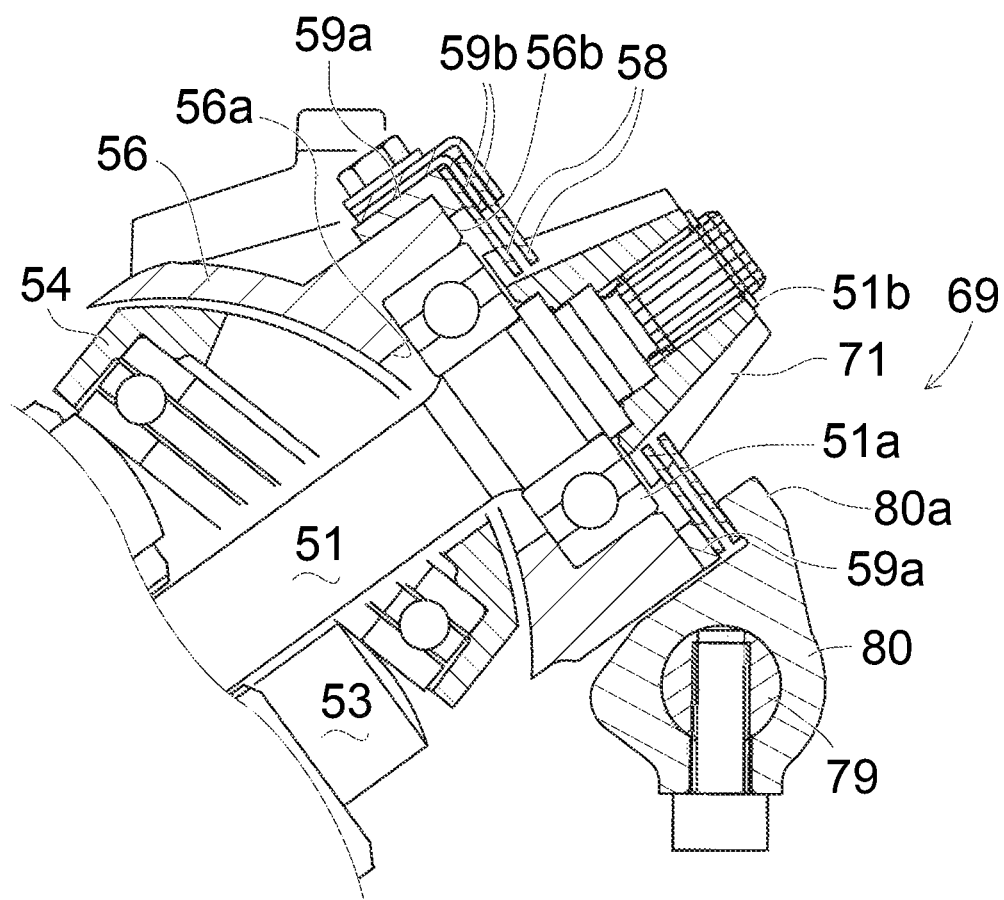
FIG. 8 is an enlarged view of a principal portion of FIG. 3 showing a brake.

Referring to FIG. 8, motor support member 56 is formed with a rearwardly upward slant through hole 56a. A bearing 51a is fitted in hole 56a. The upper portion of motor shaft 51 projecting rearwardly upward from motor cylinder block 52 is passed through movable swash plate 54 and is journalled by motor support member 56 via bearing 51a.

Motor support member 56 is formed with a flat surface 56b perpendicular to motor shaft 51. Bevel pinion 71 is fixed on the tip portion of motor shaft 51. More specifically, bevel pinion 71 is spline-fitted on the tip portion of motor shaft 51, and a circular clip 51b is engaged on the tip portion of motor shaft 51 so as to locate bevel pinion 71.

An annular brake surface member 59a is fitted on flat surface 56b of motor support member 56, and is partly extended onto an upper surface of motor support member 56. Brake discs 58 are disposed parallel to brake surface member 59a, and are engaged with teeth of bevel pinion 71 so as to be unrotatable relative to bevel pinion 71 and so as to be slidable on bevel pinion 71 in the axial direction of motor shaft 51. Plate-shaped retainers 59b as many as brake discs 58 are layered alternately with brake discs 58, and are fixed to the upper surface of motor support member 56. Retainers 59b are bent to extend parallel to brake discs 58 so as to be layered alternately with brake discs 58, thereby restricting the slidable range of brake discs 58. Outermost retainer 59b prevents brake discs 58 from moving to disengage from bevel pinion 71.

Referring to FIG. 7, right and left symmetric shaft holes 11j are formed through right and left side walls of upper housing 11, and laterally horizontal brake operation shaft 79 is pivotally supported at right and left end portions thereof through right and left shaft holes 11j rotatably relative to upper housing 11. The left end of brake operation shaft 79 projecting outward from upper housing 11 is selected to have a parking brake arm 78 fixed thereon. More specifically, brake operation shaft 79 has the end portion projecting outward from the proximal side surface of transaxle casing 10 opposite the distal side surface of transaxle casing 10 from which right axle 2R projects outward. Parking brake arm 78 is disposed in the proximal outside of transaxle casing 10 and is connected to the projecting end portion of brake operation shaft 79 pivotally on the axis of brake operation shaft 79.

Referring to FIG. 3, in gear chamber 10b, when viewed in side, a triangular space is provided between rearwardly upward extended hydraulic motor 50 and bull gear 77, and is used to locate brake operation shaft 79 and a pressure arm 80. In gear chamber 10b, pressure arm 80 is fixed on brake operation shaft 79. A tip portion of pressure arm 80 is formed with a pawl 80a to be pressed against brake discs 58. When parking brake arm 78 is located at an unbraking position, pawl 80a is separated from brake discs 58. When parking brake arm 78 is located at a braking position, as shown in FIG. 8, pawl 80a is pressed against brake discs 58 so as to press brake discs 58 against surfaces of retainers 59b and brake surface member 59a, thereby braking bevel pinion 71 together with brake discs 58.

Referring to FIG. 1, as mentioned above, vehicle 100 is provided with parking brake control mechanism 169 configured to rotate parking brake arms 78 of right and left transaxles 1R and 1L according to operation of parking brake pedal 64. Parking brake control mechanism 169 will now be described in detail. As shown in FIG. 1, each of right and left link rods 19R and 19L has a front end serving as a starting end 19a, and has a rear end serving as a terminal end 19b. Starting ends 19a of right and left link rods 19R and 19L are connected to parking brake pedal 64.

Referring to FIG. 1, while right and left axles 2R and 2L of respective right and left transaxles 1R and 1L are disposed coaxially to each other, terminal ends 19b of respective link rods 19R and 19L are located at different positions in the fore-and-aft direction of vehicle 100 so as to be connected to respective right and left transaxles 1R and 1L. More specifically, terminal end 19b of right link rod 19R is disposed forward from terminal end 19b of left link rod 19L.

Now, left transaxle 1L having parking brake arm 78 connected to left link rod 19L will be described with reference to FIG. 11. Left transaxle 1L includes parking brake arm 78 fixed on the right end portion of brake operation shaft 79 projecting rightward from the proximal right side surface of transaxle casing 10. In this regard, parking brake arm 78 is formed in a basal end portion thereof with a pivot hole 78a, into which the proximal right end portion of brake operation shaft 79 is inserted fixedly (i.e., unrotatably relative to parking brake arm 78). Parking brake arm 78 of left transaxle 1L is extended upward from its basal end portion provided on the right end portion of brake operation shaft 79 so as to have an upper end portion formed with a connection hole 78b, into which terminal end 19b of left link rod 19L is fitted pivotally (i.e., rotatably relative to parking brake arm 78).

In this regard, as mentioned above, tension pulley 91 is disposed at the proximal right side of the proximal right side surface of transaxle casing 10 of left transaxle 1L adjacently to left transaxle 1L, however, it cannot happen that tension pulley 91 approaches transaxle casing 10 of left transaxle 1L so as to interfere with left link rod 19L, because tension pulley 91 that is fixed in location except for its rotatability according to driving belt 7 does not come to intersect left link rod 19L. Therefore, left transaxle 1L employs the ordinary way for its connection to left link rod 19L so that terminal end 19b of left link rod 19L is connected to the upper end portion of parking brake arm 78 extended upward from its basal end portion fixed on the end of brake operation shaft 79.

Figure 11:
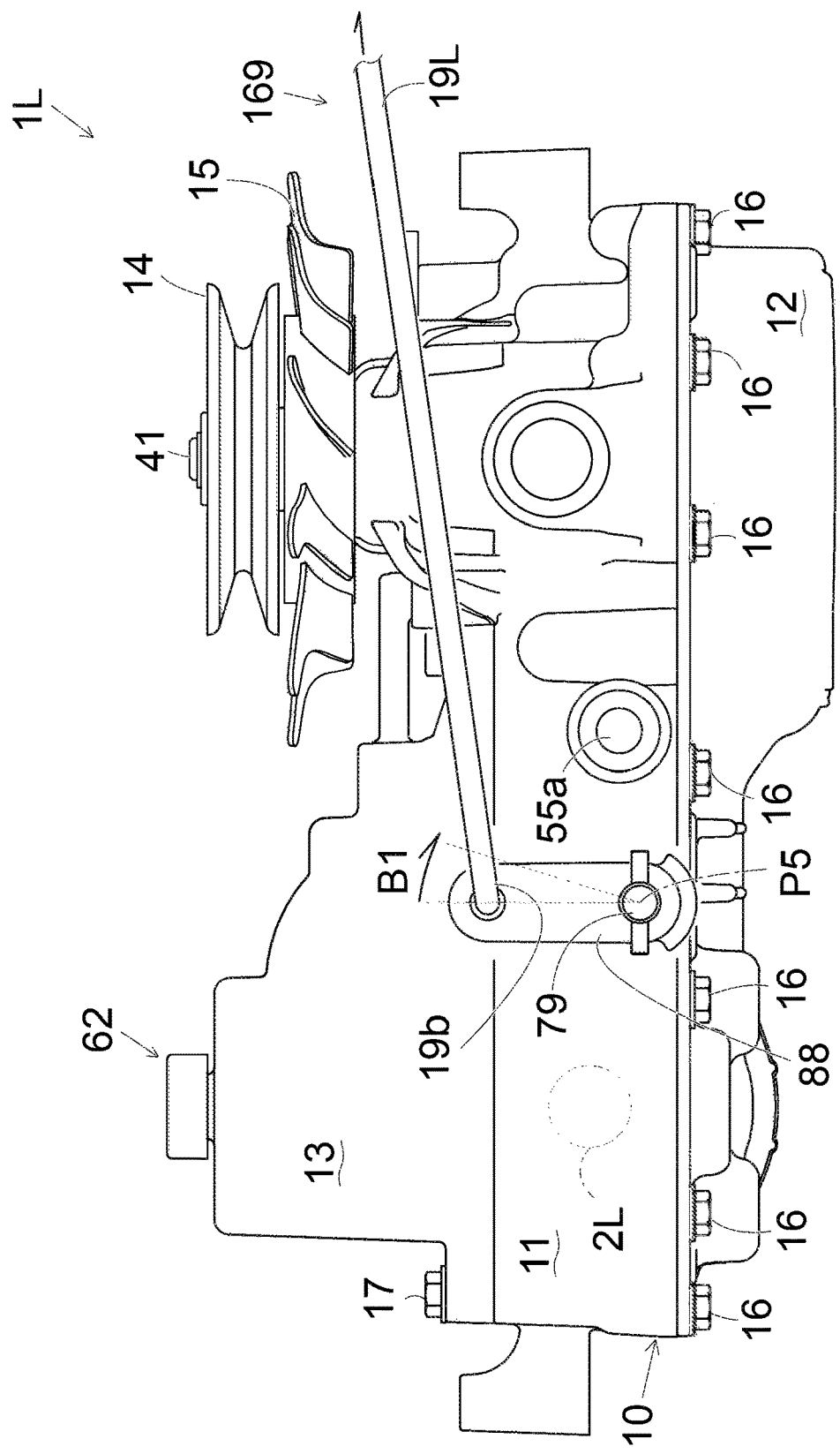
FIG. 11 is a right side view of the left transaxle.

When parking brake pedal 64 is depressed, left link rod 19L is pulled together with right link rod 19R forward so as to rotate the upper end portion of parking brake arm 78 of left transaxle 1L forward, thereby causing brake operation shaft 79 to rotate clockwise as designated by an arrow B1 when the proximal right side surface of transaxle casing 10 of left transaxle 1L is viewed as shown in FIG. 11, i.e., counterclockwise in the left side view of left transaxle 1L. This rotation of brake operation shaft 79 causes pressure arm 80 to rotate so as to press pawl 80a against brake discs 58, thereby braking left axle 2L of left transaxle 1L.

On the contrary, right transaxle 1R having parking brake arm 78 connected to right link rod 19R via a relay arm 81 and a link rod 83 will be described. As mentioned above, vehicle 100 includes tension clutch pulley 92 disposed adjacently at the proximal left side of transaxle casing 10 of right transaxle 1R. When pulley 92 is operated for disengaging the tension clutch, pulley 92 approaches the proximal left side surface of transaxle casing 10 of right transaxle 1R. In this state, if right link rod 19R were operatively connected to right transaxle 1R in the same way as the connection of left link rod 19L to left transaxle 1L, i.e., if parking brake arm 78 of right transaxle 1R were extended upward from brake operation shaft 79, and right link rod 19R were directly connected at terminal end 19b thereof to the upper end portion of parking brake arm 78, link rod 19R would interfere with pulley 92 operated for disengaging the tension clutch.

To avoid the interference of tension clutch pulley 92 with a link rod connected to parking brake arm 78, first, parking brake arm 78 of right transaxle 1R is extended downward from brake operation shaft 79 so as to have a link rod connected to a lower end portion thereof via connection hole 78b below pulley 92. More specifically, parking brake arm 78 of right transaxle 1R is identical to above-mentioned parking brake arm 78 of left transaxle 1L. The proximal left end portion of brake operation shaft 79 projecting from the proximal left side surface of transaxle casing 10 of right transaxle 1R is fixedly inserted into pivot hole 78a in the basal end portion of parking brake arm 78 of right transaxle 1R. Parking brake arm 78 of right transaxle 1R is extended downward from the basal end portion thereof provided on the left end portion of brake operation shaft 79 so as to have connection hole 78b in its lower end portion.

Figure 9:
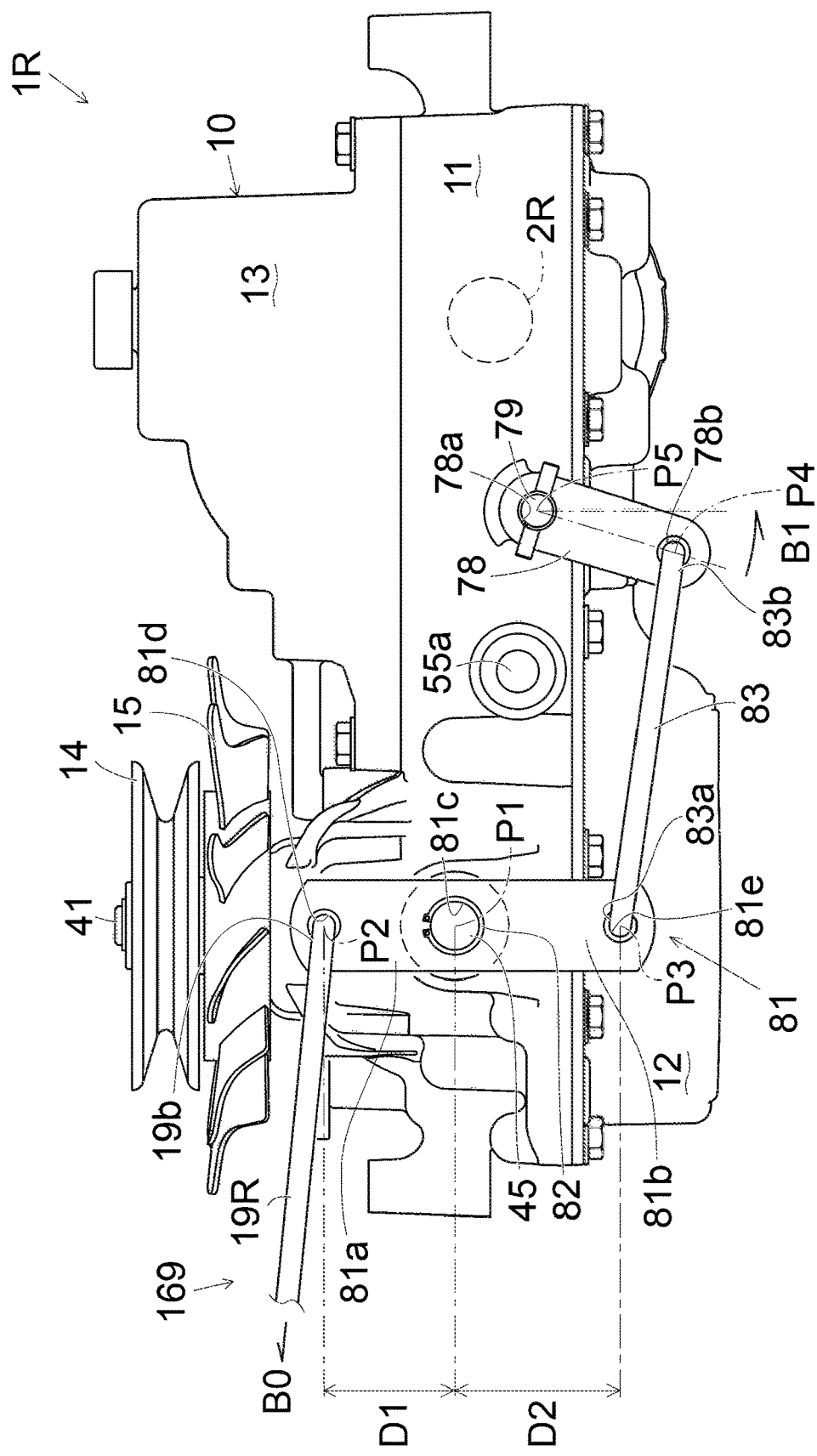
FIG. 9 is a left side view of the right transaxle.

Therefore, in each of transaxles 1R and 1L, parking brake arm 78 is unrotatable relative to brake operation shaft 79 and is rotatable relative to transaxle casing 10. Referring to FIGS. 4, 9 and 11, parking brake arm 78 has a pivotal axis P5 coinciding to the axis of brake operation shaft 79, and parking brake arm 78 is interlocked with brake operation shaft 79 so that rotation of parking brake arm 78 causes rotation of brake operation shaft 79. Incidentally, parking brake arm 78 may not be completely fixed to brake operation shaft 79, i.e., parking brake arm 78 may have a play range for rotation relative to brake operation shaft 79, only if pivotal axis P5 of parking brake arm 78 coinciding to the axis of brake operation shaft 79 is ensured and the rotation of parking brake arm 78 out of the rotational play range causes rotation of brake operation shaft 79.

For the above-mentioned purpose of preventing brake arm 78 or a link rod connected to brake arm 78 from interfering with other members in vehicle 100, it may be conceivable that parking brake arm 78 is extended downward and right link rod 19R is directly connected to the lower end portion of parking brake arm 78 of right transaxle 1R. However, it causes another problem that the rotational direction of brake operation shaft 79 according to depression of parking brake pedal 64 comes opposite its proper rotational direction for applying the parking brake. In this regard, as understood from the description about rotation of brake operation shaft 79 of left transaxle 1L, the proper rotational direction of brake operation shaft 79 for activating parking brake 69 for braking motor shaft 51 is counterclockwise in the left side view of each transaxle 1R or 1L. On the contrary, since link rod 19R is pulled forward together with link rod 19L according to the depression of parking brake pedal 64, brake operation shaft 79 would rotate clockwise in the left side view of right transaxle 1R, i.e., opposite the proper direction for applying the parking brake, according to the forward movement of right link rod 19R by depressing parking brake pedal 64, if terminal end 19b of link rod 19R were directly connected to the lower end portion of parking brake arm 78 extended downward from brake operation shaft 79.

Therefore, to match the rotational direction of brake operation shaft 79 according to depression of parking brake pedal 64 with its proper rotational direction for applying the parking brake, parking brake control mechanism 169 includes relay arm 81 and link rod 83 interposed between right link rod 19R and the lower end portion of downwardly extended parking brake arm 78 of right transaxle 1R, as shown in FIGS. 1, 2, 4, 7, 9 and 10. Incidentally, it should be noticed that link rod 83 is omitted in FIG. 1 just for convenience in illustration.

Relay arm 81 is extended substantially vertically, and is pivoted at the vertical intermediate portion thereof on a pivotal axis provided on the proximal left side of transaxle casing 10 of right transaxle 1R so as to have upper and lower ends opposite each other with respect to the pivotal axis of relay arm 81. Relay arm 81 includes an upper arm portion 81a extended upward from the pivotal axis to the upper end of relay arm 81 so as to have an upper end portion connected to link rod 19R. Relay arm 81 includes a lower arm portion 81b extended downward from the pivotal axis to the lower end of relay arm 81 so as to have a lower end portion connected to link rod 83, so that link rod 83 is interposed between the lower end portion of relay arm 81 and the lower end portion of parking brake arm 78 of right transaxle 1R, so that link rod 83 is disposed below tension clutch pulley 92 safely from interfering with pulley 92. Relay arm 81 functions to convert the forward movement (as designated by an arrow B0 in FIG. 9) of right link rod 19R connected at its terminal end 19b to the upper end portion of relay arm 81 according to depression of parking brake pedal 64 into the rearward movement of link rod 83 interposed between the lower end portion of relay arm 81 and the lower end portion of parking brake arm 78. As a result, when parking brake pedal 64 is depressed, link rod 83 connected at its terminal end 83b to the lower end portion of parking brake arm 78 is moved rearward so as to rotate brake operation shaft 79 counterclockwise in the left side view (as designated by arrow B1 in FIG. 9), i.e., in the proper rotational direction to apply parking brake 69 of right transaxle 1R.

As mentioned above, link rod 83 is disposed below pulley 92 to avoid its interference with pulley 92. On the other hand, to prevent relay arm 81 from interfering with tension clutch pulley 92, relay arm 81 may be disposed at any position on the proximal left side of transaxle casing 10 of right transaxle 1R forward from pulley 92. For example, a lateral horizontal pivot shaft other than trunnion shafts 45 of movable swash plate 44 may be supported at a front end portion of transaxle casing 10 so as to have relay arm 81 pivoted thereon, or relay arm 81 may be pivoted on a projection formed on transaxle casing 10 (e.g., upper housing 11). However, in this embodiment, left trunnion shaft 45 serves as a relay shaft for pivoting relay arm 81 thereon in consideration of the convenience of the left end portion of left trunnion shaft 45, which is left without speed control arm 46 thereon, and which is disposed forward from pulley 92 appropriately to avoid interference with pulley 92.

In this regard, relay arm 81 is provided on the left end portion of left trunnion shaft 45 projecting leftwardly outward from the proximal left side surface of upper housing 11, while speed control arm 46 is provided on the right end portion of right trunnion shaft 45 projecting rightwardly outward from the distal right side surface of upper housing 11. Relay arm 81 is formed in the intermediate portion thereof with a pivot hole 81c. The left end portion of left trunnion shaft 45 is passed through pivot hole 81c. Relay arm 81 provided on left trunnion shaft 45 is formed with an upper connection hole 81d in the upper portion of upper arm portion 81a extended upward from pivot hole 81c, and is formed with a lower connection hole 81e in the lower end portion of lower arm portion 81b extended downward from pivot hole 81c. A circular clip 82 is engaged on the left end portion of left trunnion shaft 45 at the proximal outside of relay arm 81 so as to prevent relay arm 81 falling from left trunnion shaft 45, however, so as to allow relay arm 81 to rotate relative to trunnion shafts 45 of movable swash plate 44. In other words, relay arm 81 has a pivotal axis P1 coinciding to the axis of trunnion shaft 45, i.e., the axis of trunnion shaft 45 serves as pivotal axis P1 for relay arm 81, however, relay arm 81 is not fixed to trunnion shaft 45, so that rotation of relay arm 81 does not cause rotation of trunnion shafts 45.

Referring to FIG. 2, terminal end 19b of right link rod 19R is bent distally, i.e., rightward, toward transaxle casing 10 and is fitted into connection hole 81d in the upper end portion of relay arm 81. Terminal end 19b of link rod 19R has a pivotal axis P2 coinciding to a central axis of connection hole 81d. In other words, terminal end 19b of link rod 19R and the upper end portion of relay arm 81 are connected to each other so that they are centered on pivotal axis P2 rotatably relative to each other. In this regard, right link rod 19R has the fore-and-aft length between its starting and terminal ends 19a and 19b, which is shorter than that of left link rod 19L, so that terminal end 19b of right link rod 19R connected to the upper end portion of relay arm 81 is disposed forward from terminal end 19b of left link rod 19L connected to the upper end portion of parking brake arm 78, as mentioned above.

Link rod 83 interposed between relay arm 81 and parking brake arm 78 is extended substantially in the fore-and-aft direction of vehicle 100 so as to have a front end serving as a starting end 83a and a rear end serving as a terminal end 83b. Referring to FIG. 2, link rod 83 is bent at starting and terminal ends 83a and 83b distally (i.e., rightward) toward transaxle casing 10, so that starting end 83a of link rod 83 is fitted into connection hole 81e in the lower end portion of relay arm 81, and terminal end 83b of link rod 83 is fitted into connection hole 78b in the lower end portion of parking brake arm 78. Starting end 83a of link rod 83 has a pivotal axis P3 coinciding to a central axis of connection hole 81e. In other words, starting end 83a of link rod 83 and the lower end portion of relay arm 81 are connected to each other so that they are centered on pivotal axis P3 rotatably relative to each other. Terminal end 83b of link rod 83 has a pivotal axis P4 coinciding to a central axis of connection hole 78b. In other words, terminal end 83b of link rod 83 and the lower end portion of parking brake arm 78 are connected to each other so that they are centered on pivotal axis P4 rotatably relative to each other.

The dimension of upper arm portion 81a of relay arm 81 is determined so as to have a distance D1 from pivotal axis P1 to pivotal axis P2. The dimension of lower arm portion 81b of relay arm 81 is determined so as to have a distance D2 from pivotal axis P1 to pivotal axis P3. The upper arm portion of relay arm 81 is shorter than the lower arm portion of relay arm 81 so that distance D1 is less than distance D2. This dimension setting of relay arm 81 having the difference between distances D1 and D2 corresponds to the difference between the length of link rod 19R from starting end 19a to terminal end 19b and the length of link rod 83 from starting end 83a to terminal end 83b. Due to small distance D1, the movement of link rod 19R and upper arm portion 81a of relay arm 81 upwardly extended from trunnion shaft 45 is reduced so as to avoid their interference with pulley 92 rearward disposed therefrom, and on the other hand, due to large distance D2, the movement of link rod 83 and the rotation of parking brake arm 78 for applying parking brake 69 are enhanced efficiently relative to the reduced movement of link rod 19R.

In this way, each of transaxles 1R and 1L can be selectively designed to have parking brake arm 78 extended either upward or downward from brake operation shaft 79, and correspondingly, it can be selectively designed to have either a long link rod, such as foresaid left link rod 19L, directly connected at its terminal end to parking brake arm 78, if parking brake arm 78 is extended upward, or a short link rod, such as foresaid right link rod 19R, connected at its terminal end via relay arm 81 and link rod 83 to parking brake arm 78, if parking brake arm 78 is extended downward.

Description will be given of a mechanism for locating speed control arm 46 of representative right transaxle 1R with reference to FIGS. 1 and 12 to 15. Description of that of left transaxle 1L is omitted on the assumption that right and left transaxles 1R and 1L are symmetric as mentioned above. Trunnion shaft 45 and speed control arm 46, especially, their rotational directions, are referred to on the assumption that they appear in the right side view of right transaxle 1R as shown in FIGS. 12 to 15.

Referring to FIGS. 1, 12, 13 and 14, description will be given of the rotational range of speed control arm 46 corresponding to the operation range of control lever 60R for forwardly rotating corresponding axle 2R and drive wheel 3R. As mentioned above, the rear end of link rod 18 is fitted into connection hole 46c in the upper end portion of speed control arm 46, thereby operatively connecting speed control arm 46 of right transaxle 1R to right control lever 60R via right link rod 18. Therefore, when right control lever 60R is rotated, right link rod 18 is pulled forward or pushed rearward, so that speed control arm 46 is rotated together with trunnion shafts 45 of movable swash plate 44 in right transaxle 1R. The rotation of speed control arm 46 and trunnion shafts 45 is centered on pivotal axis P1 that also serves as the pivotal axis for rotation of relay arm 81 relative to transaxle casing 10 of right transaxle 1R as mentioned above.

Figure 13:
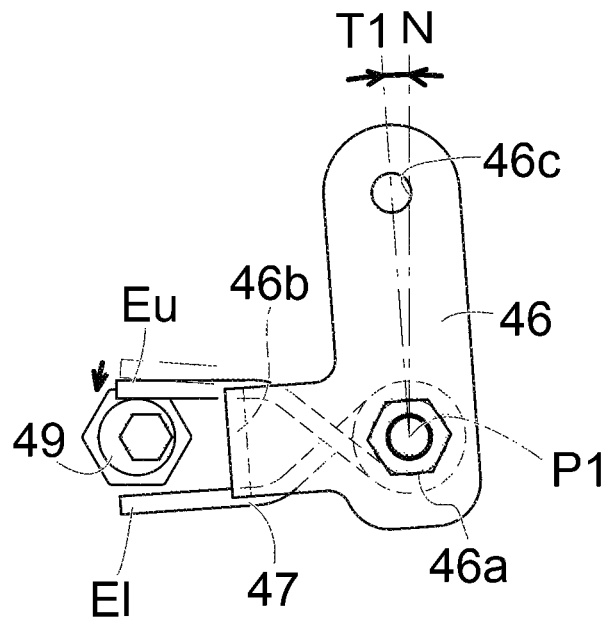
FIG. 13 is a right side view of the speed control arm rotated from the neutral position in the direction for forward rotation of the corresponding axle when the speed control arm reaches a predetermined angle.
Figure 14:
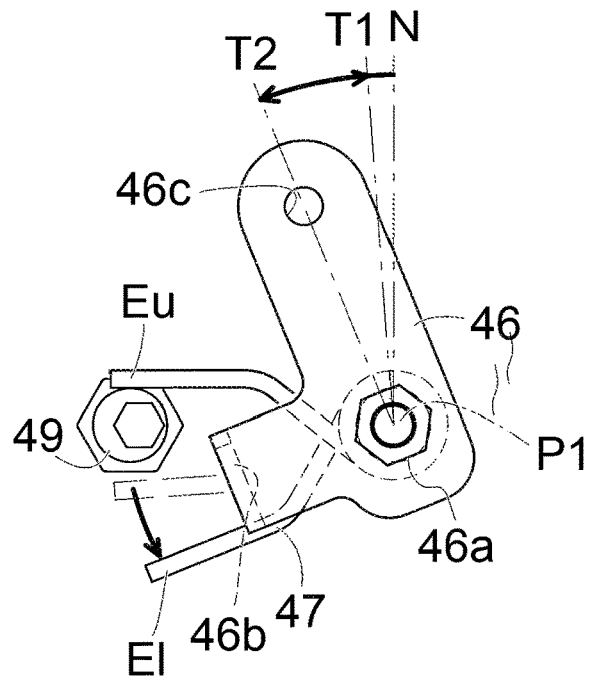
FIG. 14 is a right side view of the speed control arm rotated in the direction for forward rotation of the corresponding axle when the speed control arm reaches a maximum angle.

Referring to FIGS. 13 and 14, as control lever 60R is rotated forward from its neutral position for forwardly rotating right axle 2R, right link rod 18 moves rearward to rotate speed control arm 46 counterclockwise around pivotal axis P1 so as to increase fluid in quantity delivered from hydraulic pump 40 in the direction for driving hydraulic motor 50 for forward rotation of axle 2R. During this counterclockwise rotation of speed control arm 46, as understood from FIG. 14, pressure plate 46b moves downward so as to push lower end portion El of neutral return spring 47 downward while upper end portion Eu of neutral return spring 47 is retained by eccentric pin 49 so as to be hindered from moving downward to follow lower end portion El, thereby generating the force of neutral return spring 47 to bias lower end portion El upward toward upper end portion Eu so as to bias speed control arm 46 toward its neutral position N where upper and lower end portions Eu and El of neutral return spring 47 pinch pressure plate 46b therebetween (see FIGS. 12 and 13). Accurately, the force of neutral return spring 47 biases speed control arm 46 toward a later-discussed predetermined angle T1, however, until predetermined angle T1 is discussed, the force of neutral return spring 47 is temporarily defined as biasing speed control arm 46 toward neutral position N for the convenience of description.

Consequently, when the operator takes off right control lever 60R from the operator's hand after right control lever 60R reaches a target speed set position (for example, a maximum angle T2 in FIG. 14) in the forward rotational direction from the neutral position, speed control arm 46 automatically returns to a predetermined angle T1 by the biasing force of neutral return spring 47, and right control lever 60R automatically returns onto the neutral position side (very slow speed). This mechanism to automatically return speed control arm 46 and control lever 60R advantageously lightens the operator's loads in manipulation for reducing the traveling speed of right drive wheel 3R, and ensures safe and prompt speed reduction of drive wheel 3R in response to an operator's manipulation. The same mechanism that returns speed control arm 46 onto the neutral position side is also provided in left transaxle 1L, left link rod 18 and left control lever 60L.

However, conversely, the force of neutral return spring 47 biasing speed control arm 46 toward neutral position N means that the operator has to keep applying a force with the operator's hand to corresponding control lever 60R or 60L against the spring force of neutral return spring 47. In other words, the operator has to endure the resistance of control lever 60R or 60L against the operator's manipulation force, if the operator wants to keep the rotational speed of drive wheel 3R or 3L realized by locating control lever 60R or 60L at the corresponding speed set position.

During a normal on-road travel of vehicle 100, such a resistance of control lever 60R or 60L against the operator's manipulation force does not become a problem because the operator often rotates each of control levers 60R and 60L to change the rotational speed and direction of corresponding drive wheel 3R or 3L. In this traveling state of vehicle 100, the average speed of drive wheels 3R and 3L is rather high. On the contrary, a typical case where the problem occurs is that the lawn mower serving as vehicle 100 travels straight for a long time at a relatively low speed appropriate for mowing the lawn. During such a travel of vehicle 100, the operator has to hold right and left control levers 60R and 60L for a long time at respective determined speed positions against the resistances of control levers 60R and 60L.

Therefore, speed control arm 46 is configured so as to have a small rotational angle range where its rotation does not generate the spring force of neutral return spring 47 biasing speed control arm 46 toward neutral position N. In this regard, actually, speed control arm 46 located at its proper neutral position N accurately corresponding to the neutral position of movable swash plate 44 of hydraulic pump 40 is as shown in FIG. 12, where eccentric pin 49 abuts at the lower end thereof against lower end portion El of neutral return spring 47, and is separated at the upper end thereof from upper end portion Eu of neutral return spring 47 thereabove, while in halfways to upper and lower end portions Eu and El of neutral return spring 47 pinches pressure plate 46b therebetween, i.e., to make upper and lower ends of pressure plate 46b abut against in halfways to upper and lower end portions Eu and El of neutral return spring 47.

Referring to FIGS. 12 and 13, as speed control arm 46 is rotated counterclockwise from neutral position N, lower end portion El of neutral return spring 47 is pushed downward by pressure plate 46b away from the lower end of eccentric pin 49, and upper end portion Eu of neutral return spring 47 tending to keep the gap between upper and lower end portions Eu and El of neutral return spring 47 to pinch pressure plate 46b therebetween follows the downward movement of lower end portion El of neutral return spring 47 so as to approach the upper end of eccentric pin 49. When speed control arm 46 rotating counterclockwise from neutral position N reaches a predetermined angle T1, upper end portion Eu of neutral return spring 47 comes to abut against the upper end of eccentric pin 49.

In this way, during the rotation of speed control arm 46 between neutral position N and predetermined angle T1, the gap between upper and lower end portions Eu and El of neutral return spring 47 to pinch pressure plate 46b therebetween is kept, in other words, upper and lower end portions Eu and El of neutral return spring 47 are kept to abut against the upper and lower ends of pressure plate 46b, whereby neutral return spring 47 does not bias speed control arm 46 toward any position. Therefore, the rotational angle range of speed control arm 46 from neutral position N to predetermined angle T1 is defined as a dead zone d for neutral return spring 47 in generating its spring force to bias speed control arm 46 toward proper neutral position N as shown in FIG. 12.

In this regard, the technical feature for realizing the rotational angle range of speed control arm 46 as the dead zone d for neutral return spring 47 is that the dimension of pressure plate 46b between its upper and lower ends is set greater than the diameter of eccentric pin 49 (between its upper and lower ends) so that upper and lower end portions Eu and El of neutral return spring 47 pinching pressure plate 46b therebetween has the gap greater than the diameter of eccentric pin 49, thereby spacing at least one of upper and lower end portions Eu and El of neutral return spring 47 abutting against the upper and lower ends of pressure plate 46b from eccentric pin 49. Therefore, the difference of the gap between upper and lower end portions Eu and El of neutral return spring 47 pinching pressure plate 46b from the diameter of eccentric pin 49 equals the rotational angle range of speed control arm 46 between neutral position N and predetermined angle T1.

As far as control lever 60R is located in a low forward traveling speed setting range to locate speed control arm 46 at any one position in the rotational angle between neutral position N and predetermined angle T1, an operator can keep control lever 60R at a set desired low speed position to keep the constant low speed rotation of corresponding drive wheel 3R freely from the resistance of control lever 60R caused by the spring force of neutral return spring 47 of right transaxle 1R. Therefore, the low speed setting ranges of control levers 60R and 60L for setting respective speed control arms 46 in the rotational angle ranges between respective neutral positions N and respective predetermined angles T1 are available for traveling of vehicle 100 at a constant low speed as mentioned above, thereby being advantageous for lightening the operator from fatigue.

When speed control arm 46 is further rotated counter-clockwise from predetermined angle T1 to maximum angle T2, the above-mentioned state of neutral return spring 47 generating its force biasing speed control arm 46 occurs, that is, upper end portion Eu of neutral return spring 47 is kept to abut against eccentric pin 49, and lower end portion El of neutral return spring 47 is moved downward by pressure plate 46b so that the gap between upper and lower end portions Eu and El of neutral return spring 47 becomes greater than that to pinch pressure plate 46b therebetween, thereby generating the spring force of neutral return spring 47 biasing speed control arm 46 in the clockwise rotational direction. Therefore, the middle and high speed setting ranges of control levers 60R and 60L for setting respective speed control arms 46 in the rotational angle ranges between respective predetermined angles T1 and respective maximum angles T2 are available for the on-road traveling of vehicle 100 at various speeds with a relatively high speed. If an operator unexpectedly releases control lever 60R or 60L having been located in the middle and high speed setting range from the operator's hand, corresponding speed control arm 46 automatically returns to predetermined angle T1 and decelerates so as to keep the safety in travel of vehicle 100.

Incidentally, the biasing force neutral return spring 47 for clockwise rotation of speed control arm 46 equals to the upward pressure of lower end portion El of neutral return spring 47 against the lower end of pressure plate 46b. This upward pressure of lower end portion El of neutral return spring 47 is vanished when the upper end of pressure plate 46b pushed upward by lower end portion El of neutral return spring 47 comes to abut against upper end portion Eu of neutral return spring 47. Pressure plate 46b abuts against upper end portion Eu when speed control arm 46 rotating clockwise reaches predetermined angle T1. Therefore, as mentioned above, the spring force of neutral return spring 47 actually functions to bias speed control arm 46 toward predetermined angle T1 instead of neutral position N. To accurately stop each of drive wheels 3R and 3L, an operator has to consciously rotate corresponding control lever 60R or 60L to its neutral position by the operator's own manipulation force so as to set corresponding speed control arm 46 at neutral position N.

Figure 15:
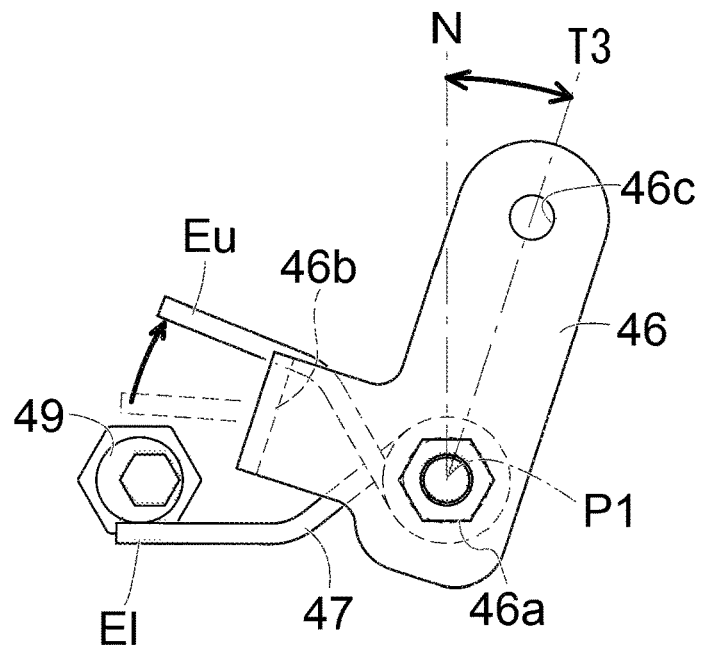
FIG. 15 is a right side view of the speed control arm rotated in the direction for backward rotation of the corresponding axle when the speed control arm reaches a maximum angle.
Figure 16:
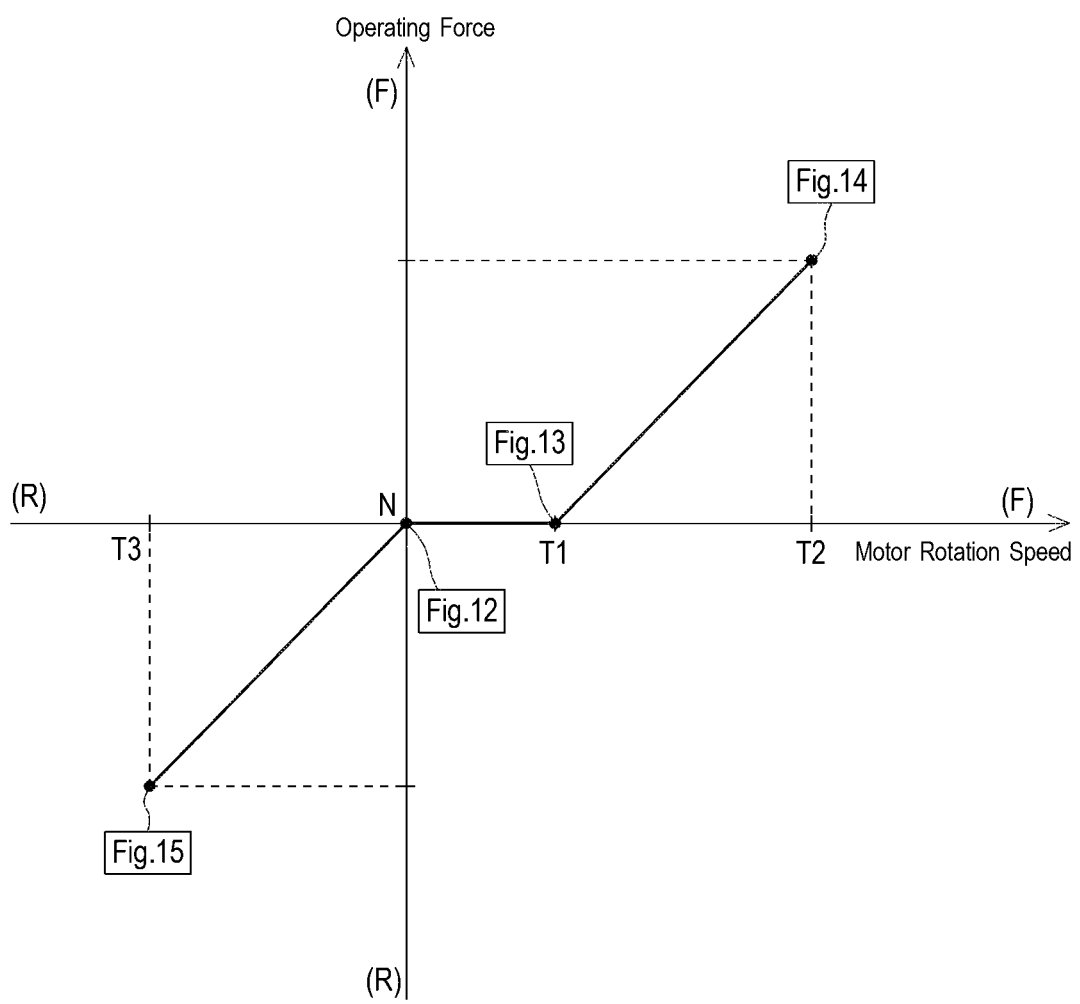
FIG. 16 is a graph showing the relationship between the operator's manipulation force required to operate the speed control arm in the direction for forward and backward rotation against force of neutral return spring and the motor rotation speed.

Referring to FIGS. 12 and 15, description will be given of the rotational range of speed control arm 46 corresponding to the operation range of control lever 60R for backwardly rotating corresponding axle 2R and drive wheel 3R.

As control lever 60R is rotated rearward from its neutral position for backwardly rotating right axle 2R, right link rod 18 moves forward to rotate speed control arm 46 clockwise around pivotal axis P1 from neutral position N to a maximum angle T3 as shown in FIG. 15, thereby increasing fluid in quantity delivered from hydraulic pump 40 in the direction for driving hydraulic motor 50 for backward rotation of axle 2R. Referring to FIG. 12, as mentioned above, when speed control arm 46 is located at neutral position N corresponding to the neutral position of movable swash plate 44, lower end portion El of neutral return spring 47 abuts against the lower end of eccentric pin 49. Therefore, as soon as the clockwise rotation of speed control arm 46 from neutral position N starts, pressure plate 46b starts moving upward so as to separate its lower end from lower end portion El of neutral return spring 47 retained by eccentric pin 49 and so as to push upper end portion Eu of neutral return spring 47 upward, so that the gap between upper and lower end portions Eu and El of neutral return spring 47 becomes greater than that for pinching pressure plate 46b, thereby causing the biasing force of neutral return spring 47 for counterclockwise rotation of speed control arm 46.

In this way, the clockwise rotation range of speed control arm 46 from neutral position N to maximum angle T3 in the direction for backward rotation of axle 2R does not include such a range corresponding to the dead zone d of neutral return spring 47 as mentioned above. Therefore, the biasing force of neutral return spring 47 applied to speed control arm 46 operated for backward rotation of axle 2R accurately biases speed control arm 46 toward neutral position N, so that, when control lever 60R having been rotated for backward rotation of axle 2R is released from the operator's manipulation force, control lever 60R automatically rotates forward until it reaches its neutral position corresponding to neutral position N of speed control arm 46. In this way, each of control levers 60R and 60L resists with the force of neutral return spring 47 against the operator's manipulation force if it is located at any position in its operation range for backward rotation of corresponding drive wheel 3R or 3L. Therefore, if control levers 60R and 60L having been located in these operation ranges are released from operator's hands, speed control arms 46 of respective transaxles 1R and 1L automatically return to respective neutral positions N by the forces of respective neutral return springs 47, so that vehicle 100 stops promptly.

Next, exemplary modifications of transaxles 1L and 1R will be described with reference to FIGS. 17 to 21. In the exemplary modifications described below, the link mechanism that connects trunnion shaft 45 to brake operation shaft 79 has a configuration different from the configuration describe above. Note that in the following, the description is made using right transaxle 1R as an example. Note that the structure of left transaxle 1L and the structure of right transaxle 1R are in symmetry to the center line indicating the longitudinal direction of vehicle 100, and hence the detailed description of left transaxle 1L is omitted.

Figure 17:
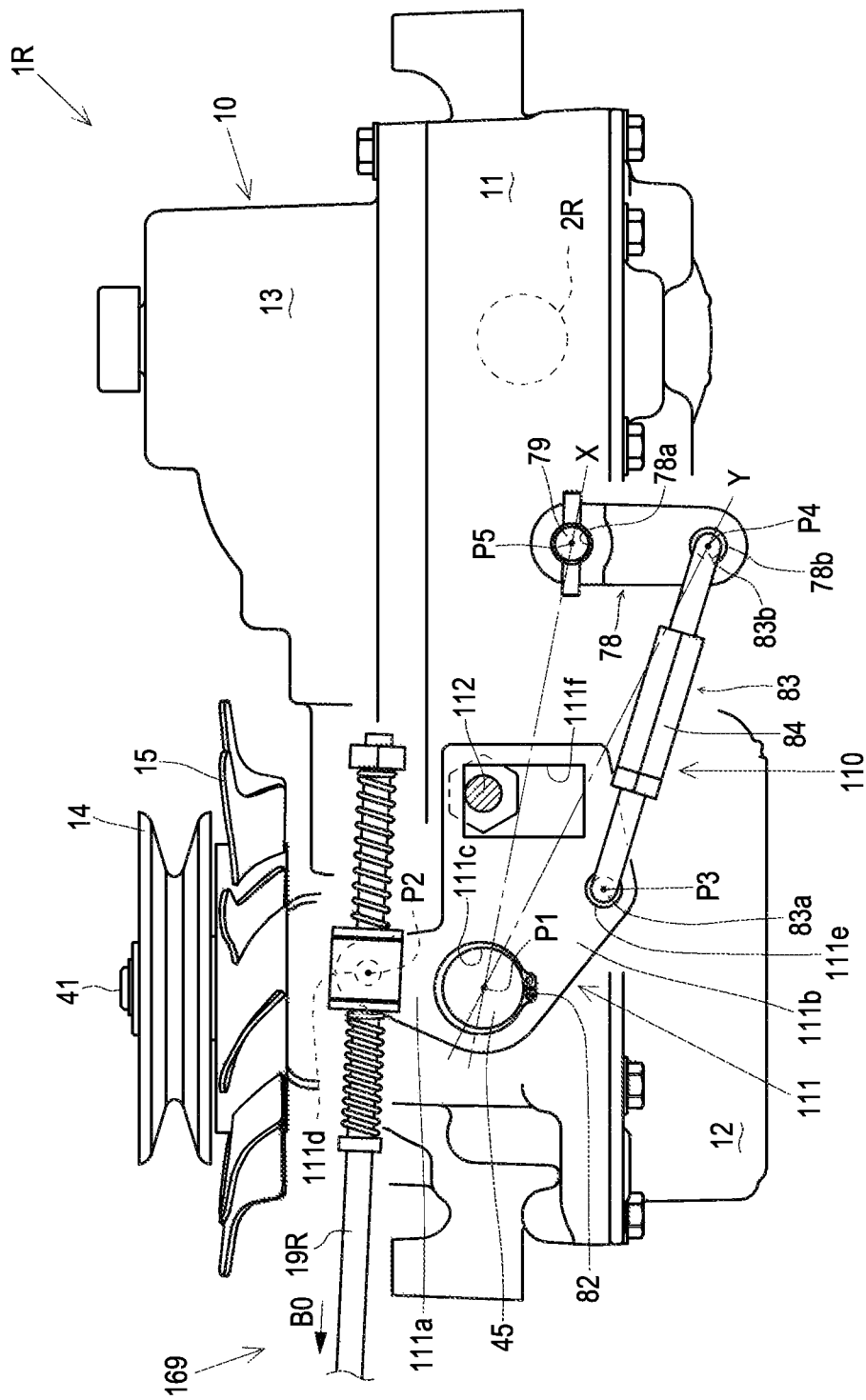
FIG. 17 is a left side view of the right transaxle including a link mechanism in a second configuration in which the starting end of a link rod is located on virtual reference line Y (or near the reference line) when a parking brake is in operation (when the parking brake is not in operation).
Figure 18:
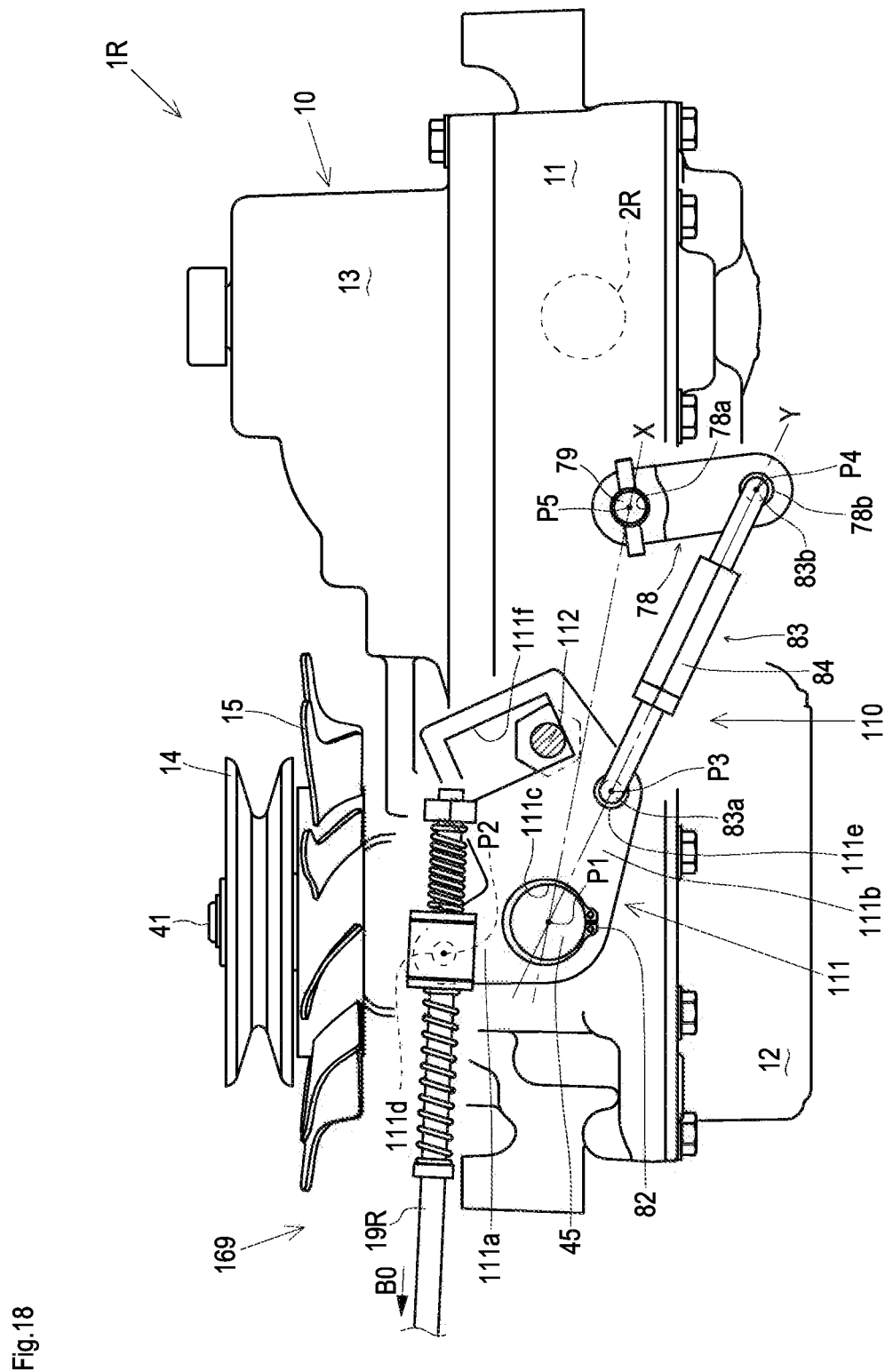
FIG. 18 is a left side view of the right transaxle including the link mechanism in the second configuration in which the starting end of the link rod is located on virtual reference line Y (or near the reference line) when the parking brake is in operation (when the parking brake is in operation).

As shown in FIGS. 17 and 18, in parking brake control mechanism 169, a relay arm 111 and link rod 83 are installed between link rod 19R on the right side and the lower end portion of parking brake arm 78 of right transaxle 1R. Parking brake arm 78 extends downward.

Relay arm 111 functions such that the forward movement of right link rod 19R (in the direction of arrow B0 shown in FIG. 17) in association with the depression of parking brake pedal 64 (see FIG. 1) is converted into the backward movement of link rod 83 installed between relay arm 111 and parking brake arm 78. As a result, in the case in which parking brake 69 is operated, pressing terminal end 83b of link rod 83 moves the lower end portion of parking brake arm 78 to the rear side, and hence brake operation shaft 79 is rotated counterclockwise when viewed from the left side.

FIGS. 17 and 18 show the first configuration of parking brake control mechanism 169. Transaxle 1R including parking brake control mechanism 169 according to the first configuration includes a link mechanism 110 configured to connect trunnion shaft 45 to brake operation shaft 79. Link mechanism 110 is composed of relay arm 111, link rod 83, and parking brake arm 78.

Link mechanism 110 includes an off-center pin 112 configured to regulate rotational range of relay arm 111. Off-center pin 112 projects from the left side face of transaxle casing 10 configuring right transaxle 1R, and has length insertable into regulating part 111f in a hole shape, described later, formed on relay arm 111. This off-center pin 112 is formed of a bar member, for example, projecting at a position eccentric to the bolt hole of the nut such that the screwed depth of the bolt hole is adjusted to change the position of off-center pin 112 to be disposed. Note that after the position of off-center pin 112 to be disposed is adjusted, off-center pin 112 is fixed using a double nut, for example, and hence the disposed position is fixed.

Relay arm 111 has a nearly L-shape, and includes an upper arm 111a extending nearly upward and a rear arm 111b extending nearly on the rear side. Relay arm 111 is formed with a pivot hole 111c near the boundary between upper arm 111a and rear arm 111b, at which relay arm 111 is relatively rotatably supported on trunnion shaft 45 on the side where trunnion shaft 45 is not manipulated. At the upper end portion of upper arm 111a extending upward from pivot hole 111c, a mounting hole 111d is formed. At the end portion of rear arm 111b extending from pivot hole 111c to the rear side, a mounting hole 111e is formed.

Relay arm 111 joins link rod 19R joined to mounting hole 111d to link rod 83 joined to mounting hole 111e. Link rod 83 includes a turnbuckle 84 in the halfway in the length direction such that the length is adjustable.

Link rod 83 is installed between relay arm 111 and parking brake arm 78, and extends nearly in the longitudinal direction of vehicle 100. Specifically, the front end portion is starting end 83a, the rear end portion is terminal end 83b, and ends 83a and 83b are bent, and are respectively inserted into mounting hole 111e at the lower end portion of relay arm 111 and joining hole 78b at the lower end portion of parking brake arm 78. Starting end 83a located at mounting hole 111e is point P3. On the other hand, terminal end 83b located at joining hole 78b is point P4.

The rotation rotational center point of relay arm 111 that is the center of trunnion shaft 45 is P1, and virtual reference line Y connecting point P1 to point P4 is set.

Here, the position of mounting hole 111e is set such that point P3 of starting end 83a of link rod 83 joined to relay arm 111 is not located on and is apart from virtual reference line Y in parking brake release state, or unbraking position, shown in FIG. 19A whereas point P3 is located on virtual reference line Y or near line Y in the parking brake operating state, or braking position, shown in FIG. 19B. Relay arm 111 includes a regulating part 111f configured to regulate rotational range of relay arm 111. Regulating part 111f is a rectangular hole formed on relay arm 111, and off-center pin 112 is inserted into inner side of the hole. The contact position on the inner surface of regulating part 111f to off-center pin 112 is adjustable by changing the position of off-center pin 112 to be disposed.

Here, the operation of link mechanism 110 will be described. FIGS. 17 and 18 show parking brake control mechanisms 169 including link mechanism 110 according to the first configuration. FIG. 17 shows right transaxle 1R with parking brake 69 (see FIG. 3) released. FIG. 18 shows right transaxle 1R with parking brake 69 (see FIG. 3) operated. In parking brake control mechanism 169 when parking brake 69 is released shown in FIG. 17, parking brake arm 78 is rotated at the unbraking position. Relay arm 111 is rotated at the position where relay arm 111 is nonrotatable further clockwise in FIG. 17 because the inner surface of regulating part 111f contacts off-center pin 112. That is, the rotation position of relay arm 111 is regulated such that relay arm 111 is reliably at the unbraking position by regulating part 111f and off-center pin 112.

At this time, in the unbraking position, point P3 at starting end 83a of link rod 83 is located at a substantial distance from virtual reference line Y.

Subsequently, after link rod 19R is displaced to the direction of arrow B0 shown in FIG. 17 in order to operate parking brake 69 (see FIG. 3), relay arm 111 is rotated in the counterclockwise direction in FIG. 17 about the rotation center P1. At this time, parking brake arm 78 is rotated in the counterclockwise direction in FIG. 17 correspondingly to the displacement of link rod 83, resulting in the parking brake arm 78 being in the braking position state as shown in FIG. 18. Accordingly, parking brake 69 brakes the axle 2R of the transaxle 1R.

At this time, relay arm 111 is rotated to the position where relay arm 111 is nonrotatable further counterclockwise in FIG. 17 because the inner surface of regulating part 111f contacts off-center pin 112. In the transaxle 1R, when the inner side surface of regulating part 111f contacts off-center pin 112, point P3 at starting end 83a of link rod 83 is located on virtual reference line Y or near line Y.

In this braking position state in which point P3 at starting end 83a of link rod 83 is located on virtual reference line Y or near line Y, if an external force that rotates parking brake arm 78 clockwise acts on the axle 2R or parking brake arm 78, for example, link rod 83 is constrained by relay arm 111 and prevents parking brake arm 78 from being rotated, and hence parking brake 69 is not released. That is, an external force acting on the axle 2R or parking brake arm 78 can be prevented from causing parking brake 69 to be unexpectedly released.

Note that as shown in FIG. 19A and FIG. 19B, between parking brake arm 78 and off-center pin 112, a return spring 120 configured to impart clockwise moment to the parking brake arm 78 is installed. When parking brake arm 78 is at the braking position, the return spring 120 is pulled by parking brake arm 78 to generate return biasing force, but the propping of link rod 83 stores and maintains biasing force. The biasing force instantaneously moves parking brake arm 78 in the direction to the release position when parking brake 69 is released.

Figure 20:
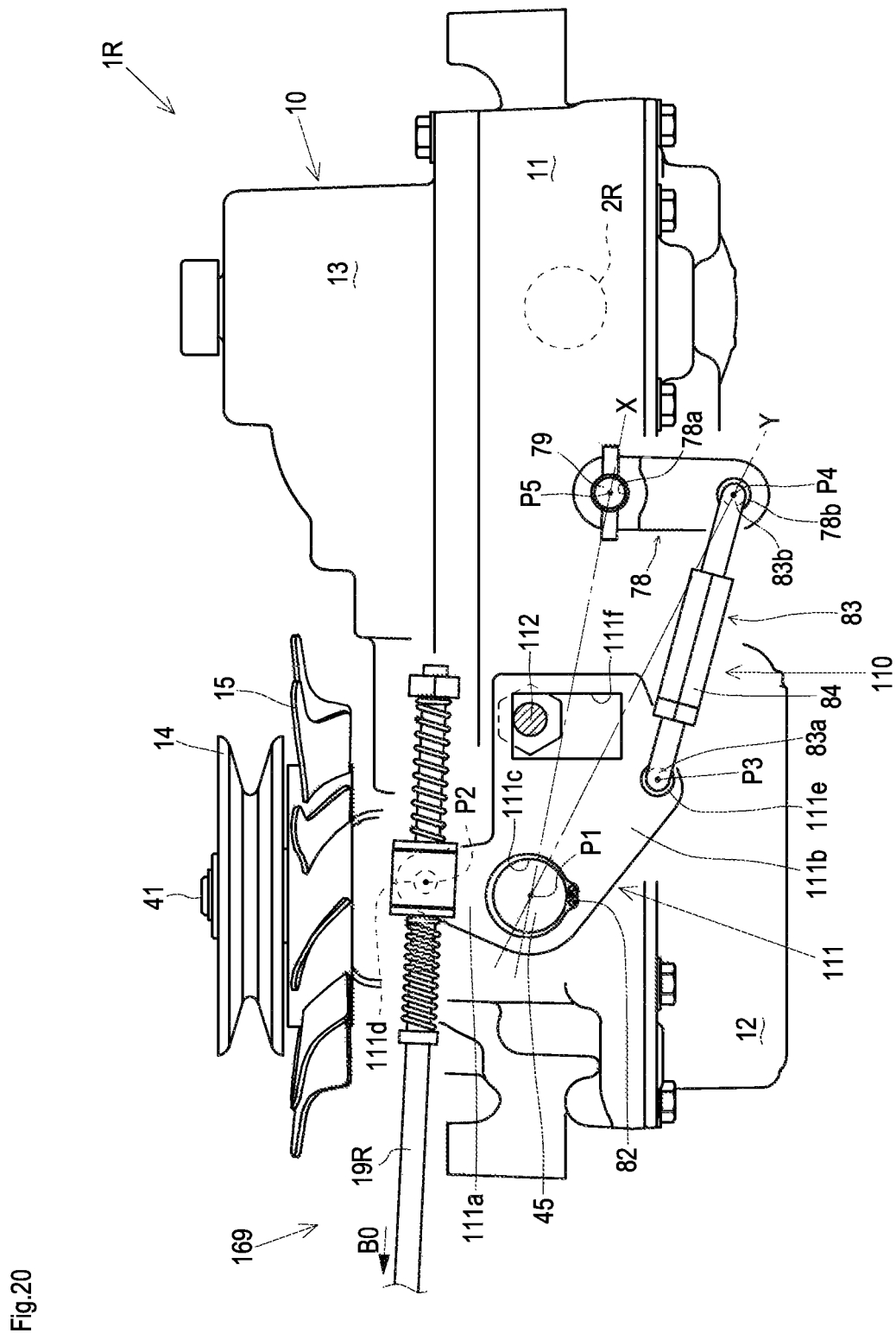
FIG. 20 is a left side view of the right transaxle (when the parking brake is not in operation) including a link mechanism in a first configuration in which the starting end of a link rod is over virtual reference line Y when the parking brake is in operation.
Figure 21:
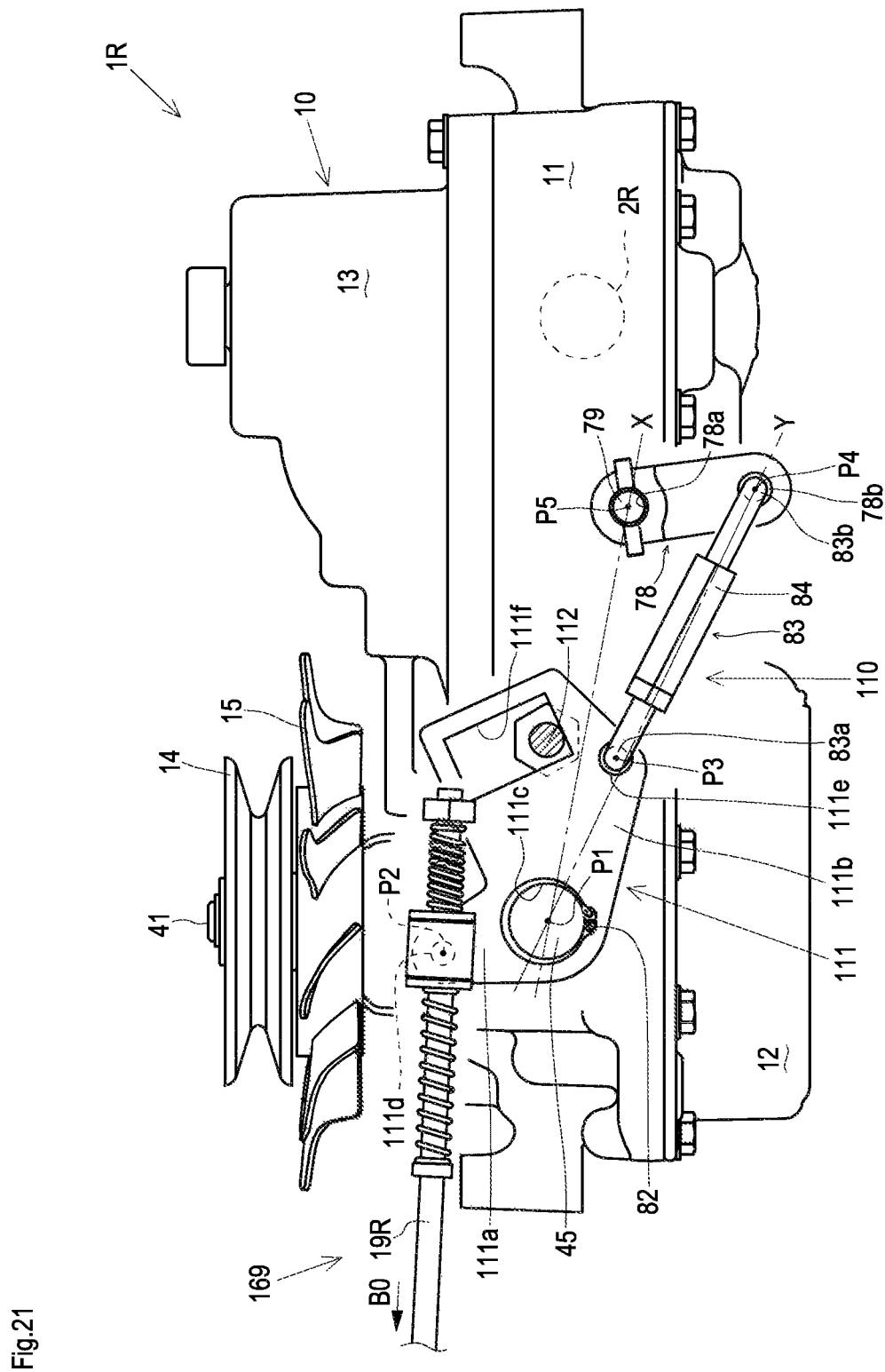
FIG. 21 is a left side view of the right transaxle (when the parking brake is in operation) including the link mechanism in the first configuration in which the starting end of the link rod is over virtual reference line Y when the parking brake is in operation.

FIGS. 20 and 21 show link mechanism 110 in a second configuration. In link mechanism 110 according to the second configuration, the positional relationship is set in which point P3 at starting end 83a of link rod 83 is over virtual reference line Y to relay arm 111 in the brake release state (unbraking position). On this point, link mechanism 110 according to the second configuration is different from the link mechanism according to the first configuration described above.

FIG. 20 shows right transaxle 1R with parking brake 69 (see FIG. 3) released. At this time, point P3 at starting end 83a of link rod 83 is located a substantial distance away from virtual reference line Y, which is not different from FIG. 17 described above.

Subsequently, after link rod 19R is displaced in the direction of arrow B0 shown in FIG. 20 in order to operate parking brake 69 (see FIG. 3), relay arm 111 is rotated in the counterclockwise direction in FIG. 20 about the rotation center P1. At this time, parking brake arm 78 is rotated in the counterclockwise direction in FIG. 20 correspondingly to the displacement of link rod 83, resulting in the state shown in FIG. 21 (the braking position). Accordingly, parking brake 69 brakes the axle 2R of the transaxle 1R.

At this time, relay arm 111 is rotated to the position where relay arm 111 is nonrotatable further counterclockwise in FIG. 21 because the inner surface of regulating part 111f contacts off-center pin 112. Point P3 at starting end 83a of link rod 83 is now located on the opposite side of virtual reference line Y from the side it is on when the system is in the brake release state (unbracing position). In this embodiment, Point P3 is not located on virtual reference line Y when the system is in the braking position.

In this state, if an external force that rotates parking brake arm 78 clockwise acts on the axle 2R or parking brake arm 78 momentarily occurs, the connection of link rod 83 acts to rotate relay arm 111 counterclockwise about the rotation center P1 due to the external force transmitted through link rod 83. However, this motion is regulated by off-center pin 112. Thus, parking brake 69 is not unexpectedly released due to the external force acting on parking brake arm 78. That is, according to the second configuration of parking brake control mechanism 169, the parking brake operating state (braking position) can be prevented from being unexpectedly released.

Figure 22:
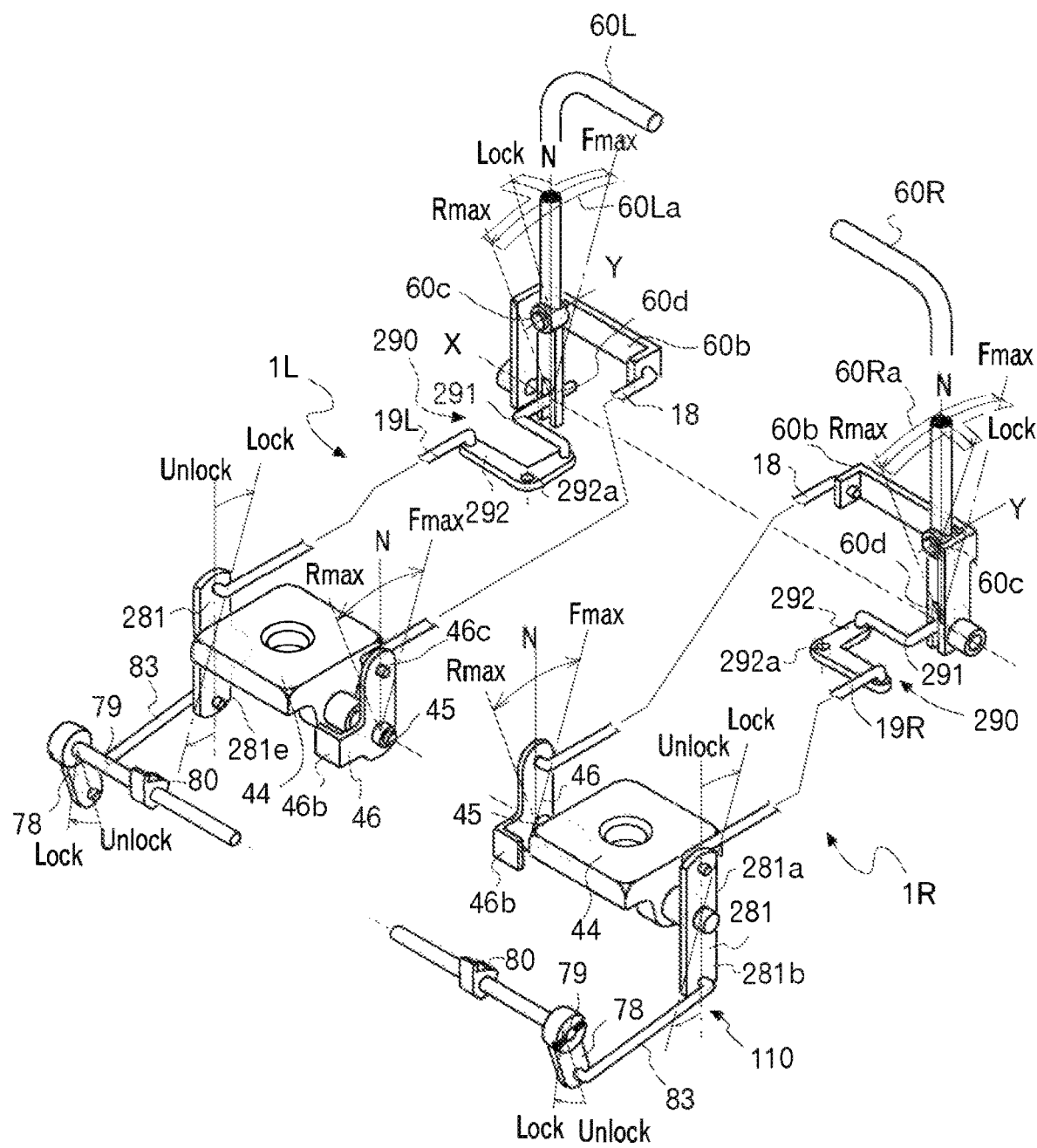
FIG. 22 is a perspective view of a partial schematic of the control mechanism for a left and right transaxle including a link mechanism having a third configuration.

Next, a modified of the transaxles 1L and 1R will be described with reference to FIG. 22. In the third modification described below, the trunnion shaft 45, which is a continuously variable transmission operating shaft, is projected out of the case, and the relay arm 281 is rotatably supported on the trunnion shaft 45 such that it can rotate relative to trunnion shaft 45. Relay arm 281 is further linked to the brake operating shaft 79 as will be discussed below.

The link mechanism is provided in the same manner as in the first embodiment. The link mechanism from the left and right control levers 60R and 60L to the speed control arm 46 of the transaxles 1L and 1R is also provided in the same manner as in the first embodiment.

For some of the ZTR cars, the rotation direction and rotation speed of the movable swash plate 44 of HST 20 of both left and right transaxles 1R and 1L is changed with left and right control levers 60R and 60L, and when the speed control arm 46 is in the neutral position, the brake operating shaft 79 is moved to the lock position by moving the left and right control levers 60R and 60L to the parking position "P". On the base side of the left and right control levers 60R and 60L, a transmission manipulation unit 60b that is supported by a transverse axle (not shown) that is provided on the vehicle body and is rotatable around the transverse axis X is provided. The lever body having a grip portion on the upper side is supported by a pin 60c provided in the transmission manipulation unit 60b and facing the front-rear direction so as to be movable along an arc-shaped path in the direction of the front-rear axis Y. Further, a lock operation unit 60d is provided on the opposite side of the grip portion.

A link rod 18 is extended rearward from the transmission manipulation unit 60b of the left and right control levers 60R and 60L to the speed control arm 46 provided on the distal side of the transaxle casing 10 of the left and right transaxles 1R and 1L. The trunnion shaft 45 projects from both the left and right sides of the casing 10, and the speed control arm 46 is provided on the trunnion shaft 45 located on the proximal face side. Further, for the left and right transaxles 1L and 1R, a neutral return spring 47 is also provided on the inner face of the transaxle casing 10 provided with the speed control arm 46 in the same manner as in the first embodiment discussed above.

The right control lever 60R can be operated to change the rotation speed and direction of the right drive wheel 3R by changing the inclination angle and direction of the movable swash plate 44 of the HST 20 (see FIG. 3 for both) described later in the right transaxle 1R by moving speed control arm 46b. Further, the left control lever 60L can be operated to change the rotation speed and direction of the left drive wheel 3L by changing the inclination angle and direction of the movable swash plate 44 of the HST 20 in the left transaxle 1L by moving speed control arm 46c. When the operator manually operates the left and right control levers 60R and 60L synchronously with the same amount of operation, the movable swash plates 44 of the HST 20 of the left and right transaxles 1R and 1L are synchronously controlled through the motions of the speed control arms 46b and 46c, and the straight running speed of the vehicle 100 in the forward direction or the reverse direction is changed. By changing the amount of operation of the left and right control levers 60R and 60L, the turning direction, the turning angle, and the speed of the vehicle 100 can be controlled.

The left and right control levers 60R and 60L are regulated in the moving direction by the lever grooves 60Ra and 60La provided on the vehicle body cover. The lever grooves 60Ra and 60La are composed of a long groove along the front-rear direction of the vehicle body and a short groove extending from the center of the long groove in the front-rear direction to the outside of the vehicle body in the left-right direction. As a result, when the left and right control levers 60R and 60L are moved along the long groove, it is possible to select a forward position in which each drive wheel 3L and 3R is rotated in the forward direction, a backwards position in which each drive wheel 3L and 3R is rotated in reverse, and a neutral position in which each drive wheel 3L and 3R is not rotating. When control levers 60R and 60L are moved along the short grooves, it is possible to select the lock position in which each drive wheel 3L and 3R is fixed and prevented from rotating.

Lock operation unit 60d of the left and right control levers 60R and 60L is configured to interlock with the relay arm 281 via a direction change link mechanism 290 and a link rod 19 (link rod 19L for the control lever 60L and link rod 19R for control rod 60R). The direction change link mechanism 290 is composed of a rod member 291 configured in an L shape in a plan view and a bell crank 292. One end of the rod member 291 is locked to the upper and lower grooves of the lock operation unit 60d, and the other end is connected to one end of the bell crank 292. When the lock operation unit 60d is tilted, the rod member 291 is pushed inward of the vehicle body. The bell crank 292 is configured to be rotatable about a rotation axis 292a on a plane orthogonal to the vertical direction, and the other end thereof is connected to the link rod 19. The link rod 19 extends in the front-rear direction, and the other end thereof is connected to the relay arm 281.

The transaxle 1R includes a relay link mechanism 110 that links the relay arm 281 and the brake operating shaft 79. Link mechanism 110 is composed of the relay arm 281, a link rod 83, and a parking brake arm 78.

The relay arm 281 has a long plate shape, and includes an upper arm portion 281a extending substantially upward and a lower arm portion 281b extending substantially downward. The relay arm 281 is freely journaled (i.e., is free to rotate) on the trunnion shaft 45 in the vicinity of the boundary between the upper arm portion 281a and the lower arm portion 281b.

The link rod 83 is interposed between and connects the relay arm 281 and the parking brake arm 78, and extends substantially in the front-rear direction of the vehicle 100. When operating a parking brake 69, the left and right control levers 60R and 60L at the N position are operated to the lock position. The rod member 291 of the link mechanism 290 moves toward the inside of the vehicle body in conjunction with the movement of the lock operation unit 60d of the left and right control levers 60R and 60L, and the bell crank 292 rotates about the rotation axis 292a so that one end thereof tilts toward the inside of the vehicle body. The rotation of the bell crank 292 pulls the link rod 19 connected to the other end forward. As a result, the upper end, of the relay arm 281, connected to the other end of the link rod 19 rotates forward, and the lower end rotates backward. When the lower end of the relay arm 281 rotates rearward, the link rod 83 is pushed rearward, so that the lower end of the parking brake arm 78 moves rearward. As a result, the parking brake 69 is operated by rotating the brake operating shaft 79 clockwise when viewed from the right side.

With a configuration in this way, using the left and right control levers 60R and 60L, the parking brake 69 is operated by simultaneously tilting them from the neutral position in a direction different from the transmission manipulation direction, that is, by tilting the left and right control levers 60R and 60L outward of the vehicle in the width direction.

Therefore, it is not necessary to separately provide a parking brake pedal or the like, and the number of parts can be reduced.

Next, a modification of the transaxles 1L and 1R will be described with reference to FIGS. 23 to 30. In the fourth modification described below, the configuration of the link mechanism for linking the relay arm 111 and the brake operating shaft 79 is different from the configuration described above. In the following, the right transaxle 1R will be mainly described. Since the structure of the left transaxle 1L and the structure of the right transaxle 1R are symmetrical with respect to the center line pointing the front-rear direction of the vehicle 100, detailed explanation of the left transaxle 1L is omitted.

Figure 23:
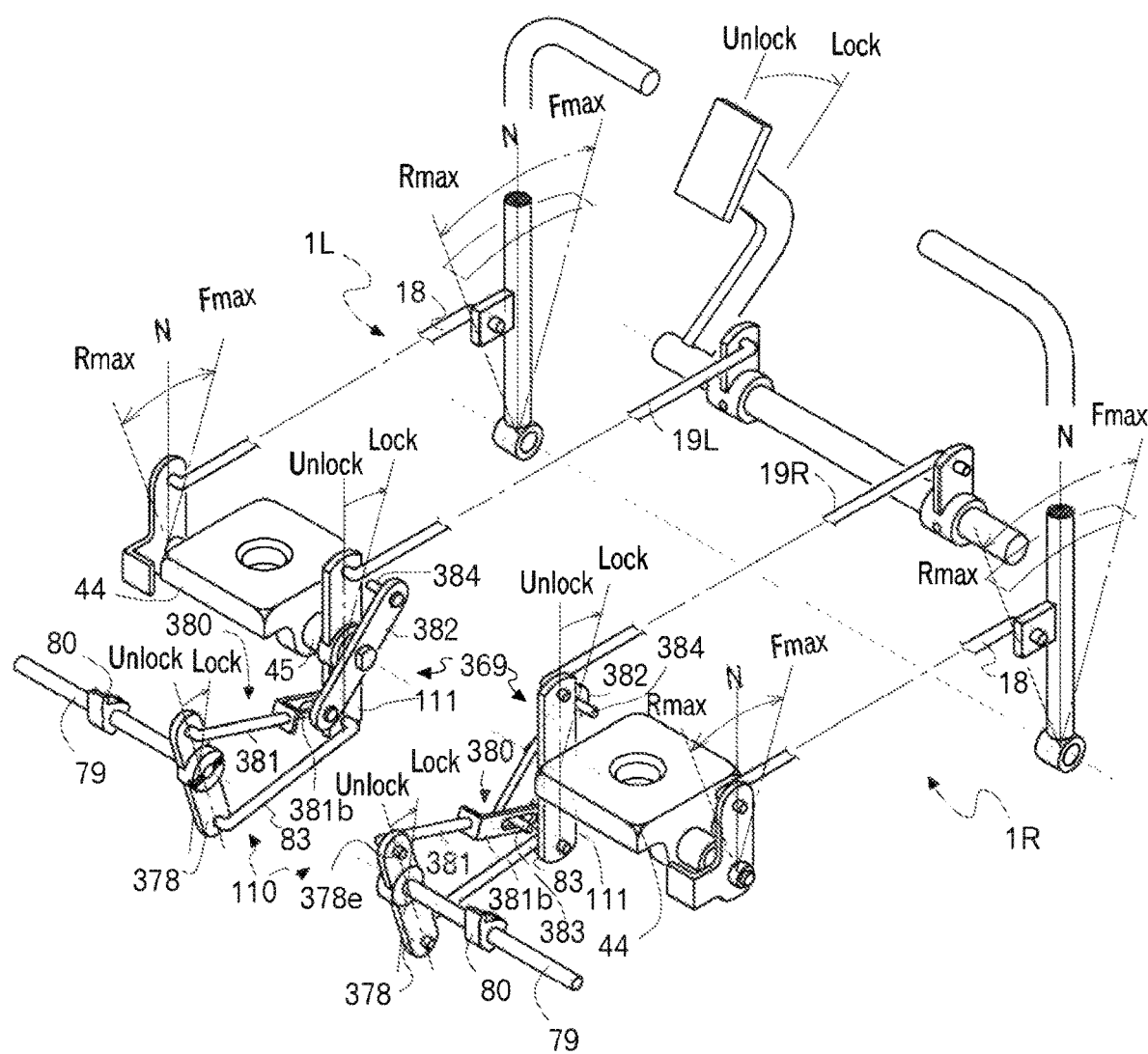
FIG. 23 is a perspective view of a partial schematic of the control mechanism for a left and right transaxle including a link mechanism having a fourth configuration.
Figure 24:
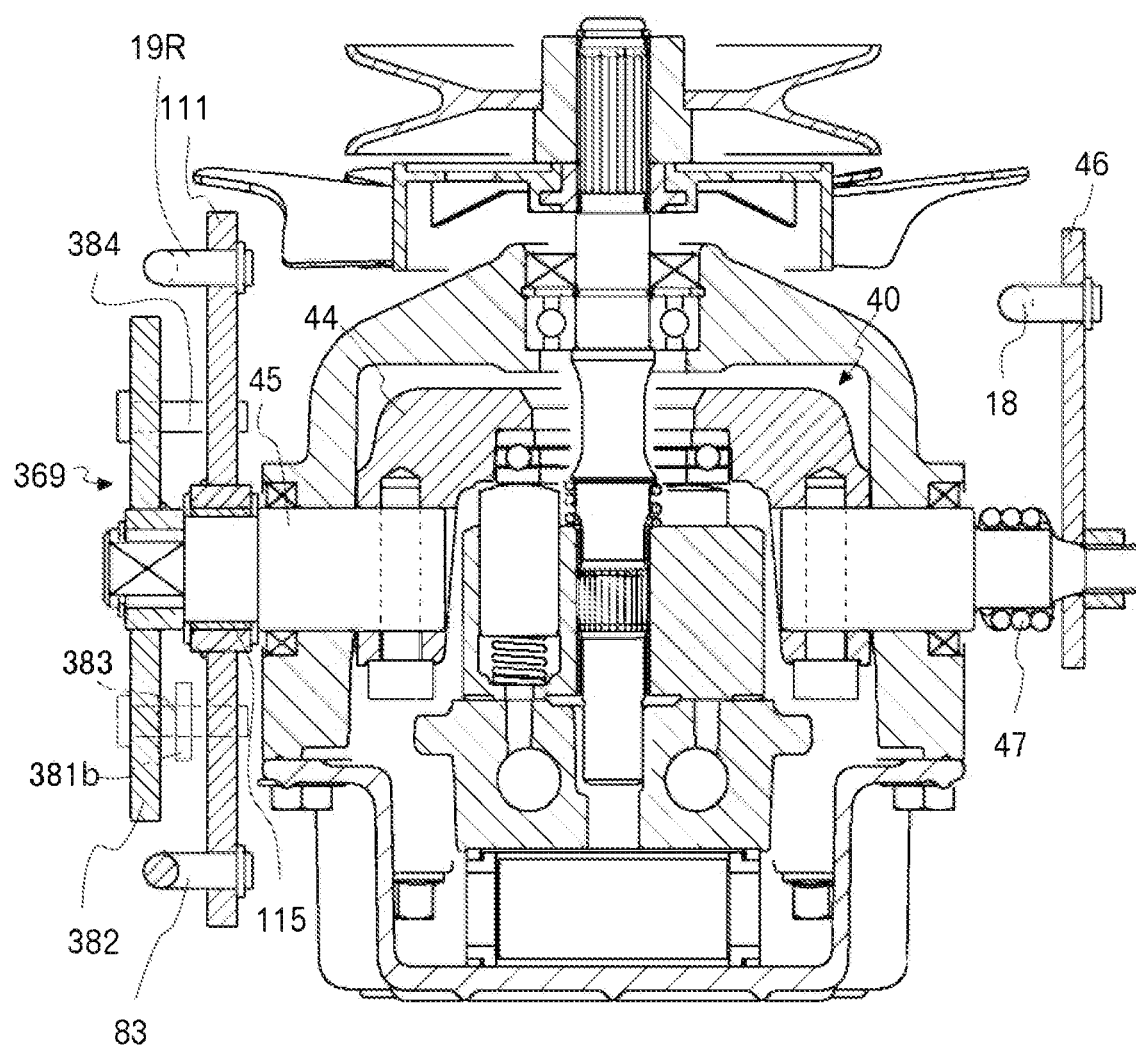
FIG. 24 is a sectional view taken along line FIG. 24-FIG. 24 of FIG. 26.

As shown in FIG. 23, in the parking brake operating mechanism 369, a relay arm 111 and the link rod 83 are interposed between the left and right link rods 19L and 19R and the lower end of the downwardly extending parking brake arm 378 of the left and right transaxles 1L and 1R. As shown in FIG. 24, the relay arm 111 in the embodiment is journalled on one end of the trunnion shaft 45 via a bearing bush 115, and is configured to float on the trunnion shaft 45 as in the embodiment. As will be described later, one end of the trunnion shaft 45 is further extended outward, and a speed control interlocking arm 382 is locked so as to be juxtaposed with the outer side of the relay arm 111. When the speed control interlocking arm 382 moves and deviates from the neutral position, the relay arm 111 is configured to move the trunnion shaft 45 integrally with the trunnion shaft 45 via the speed control interlocking arm 382.

Then, the relay arm 111 functions to convert the pulling force of the right link rod 19R accompanying the depression of a parking brake pedal 64 into the pushing force of the link rod 83. As a result, the parking brake 69 is operated. By pressing the link rod 83, the lower end of the parking brake arm 378 is rotated counterclockwise in the left side view around the brake operating shaft 79. The parking brake arm 378 is referred to as the link mechanism 110 that links the relay arm 111 and the brake operating shaft 79.

Further, the link mechanism 110 transmits the rotation of the parking brake arm 378 to the speed control arm 46. The link mechanism 110 includes a speed control interlocking mechanism 380 that moves the speed control arm 46 to a neutral position when the parking brake arm 378 rotates in a case where there are the left and right control levers 60R and 60L in the forward or reverse position.

Figure 25:
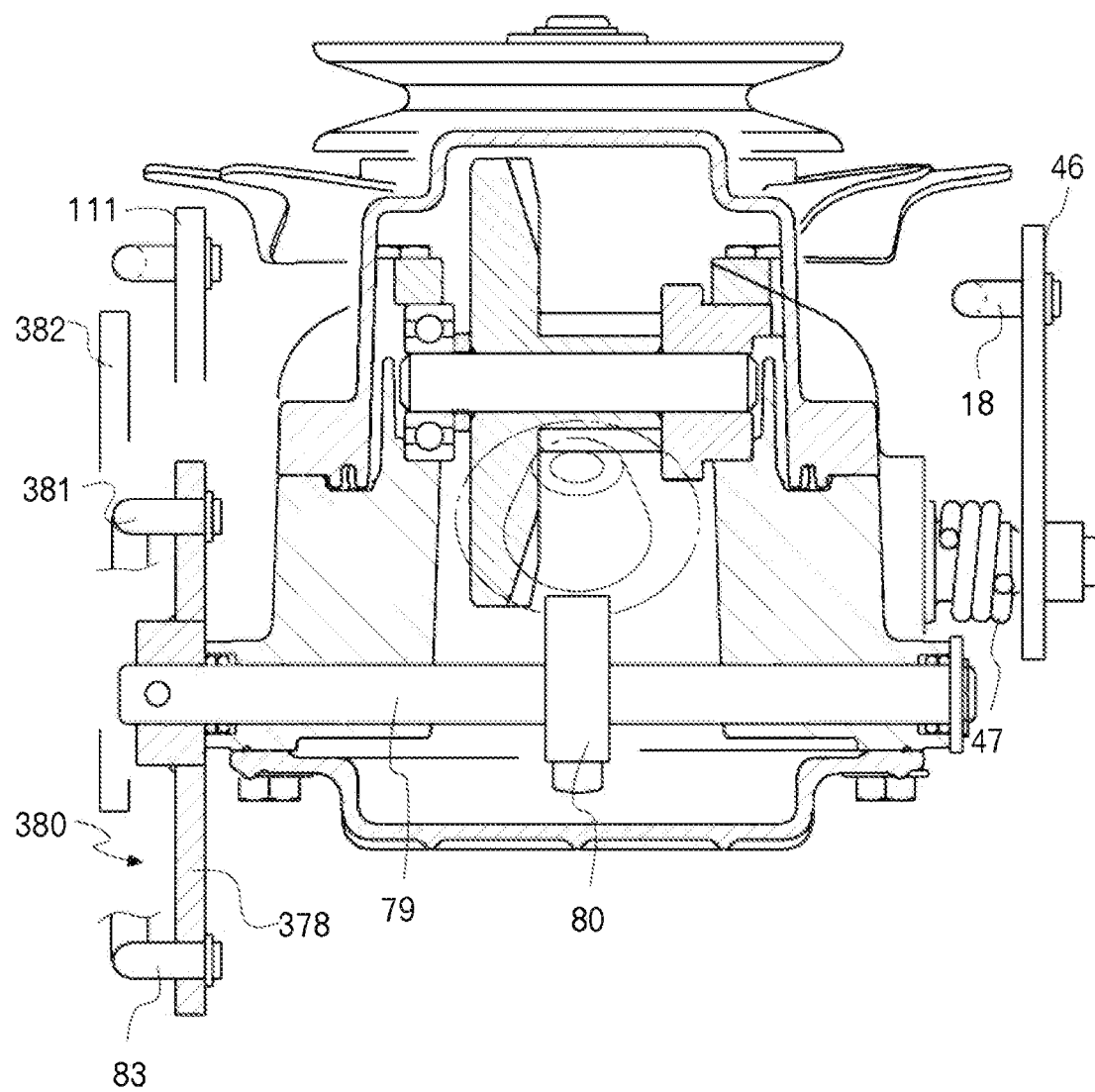
FIG. 25 is a sectional view taken along line FIG. 25-FIG. 25 of FIG. 26.

As shown in FIGS. 23 and 25, the speed control interlocking mechanism 380 includes a push link 381 that is connected to the parking brake arm 378 and the speed control interlocking arm 382 which is connected to the push link 381, disposed coaxially with the speed control arm 46, and rotates in conjunction with the speed control arm 46. Specifically, the push link 381 is bent at the rear end as the starting end and inserted into a mounting hole 378e at the upper end of the parking brake arm 378. A plate 381b having a lost motion hole 381c is provided at the terminal end of the push link 381.

The central portion of the speed control interlocking arm 382 is journalled so as not to rotate with respect to the trunnion shaft 45 (i.e., arm 382 rotates with speed control arm 46), and is configured such that the rotation of the speed control arm 46 is transmitted to the speed control interlocking arm 382. A first locking pin 383 is provided at one end of the speed control interlocking arm 382, and is set to have a length that allows it to contact with the rear end face of the relay arm 111. Also, first locking pin 383 passes through the lost motion hole 381c of the push link 381 in the middle. Further, a second locking pin 384 is provided at the other end of the speed control interlocking arm 382, and is set to have a length that allows it to contact the front end face of the relay arm 111.

Next, the forced movement to the speed control neutral position via the speed control interlocking arm 382 when the parking brake pedal 64 is depressed will be described with reference to FIGS. 26 to 30.

Figure 26:
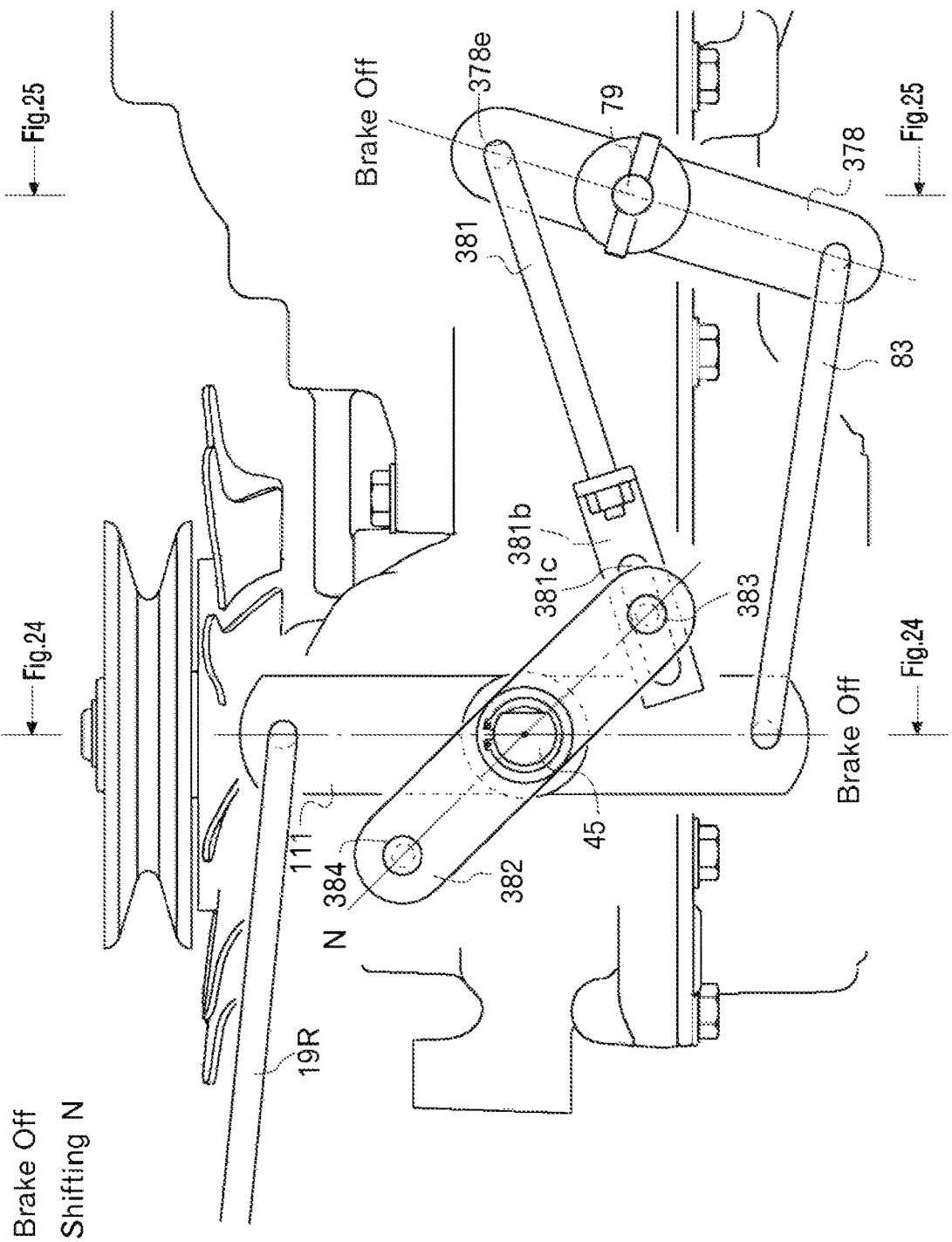
FIG. 26 is a left side view of the parking brake arm and the relay arm when the parking brake pedal is not depressed and in an off state, and the left and right control levers are in the neutral position.

As shown in FIG. 26, when the parking brake pedal 64 is not depressed, the relay arm 111 is in a vertical state, and when the left and right control levers 60R and 60L are in the neutral position "N", the speed control interlocking arm 382 is tilted by about 45 degrees. In this state, the first and second locking pins 383 and 384 of the speed control interlocking arm 382 are not in contact with the relay arm 111, and the second locking pin 384 is in the middle position of the lost motion hole 381c.

Figure 27:
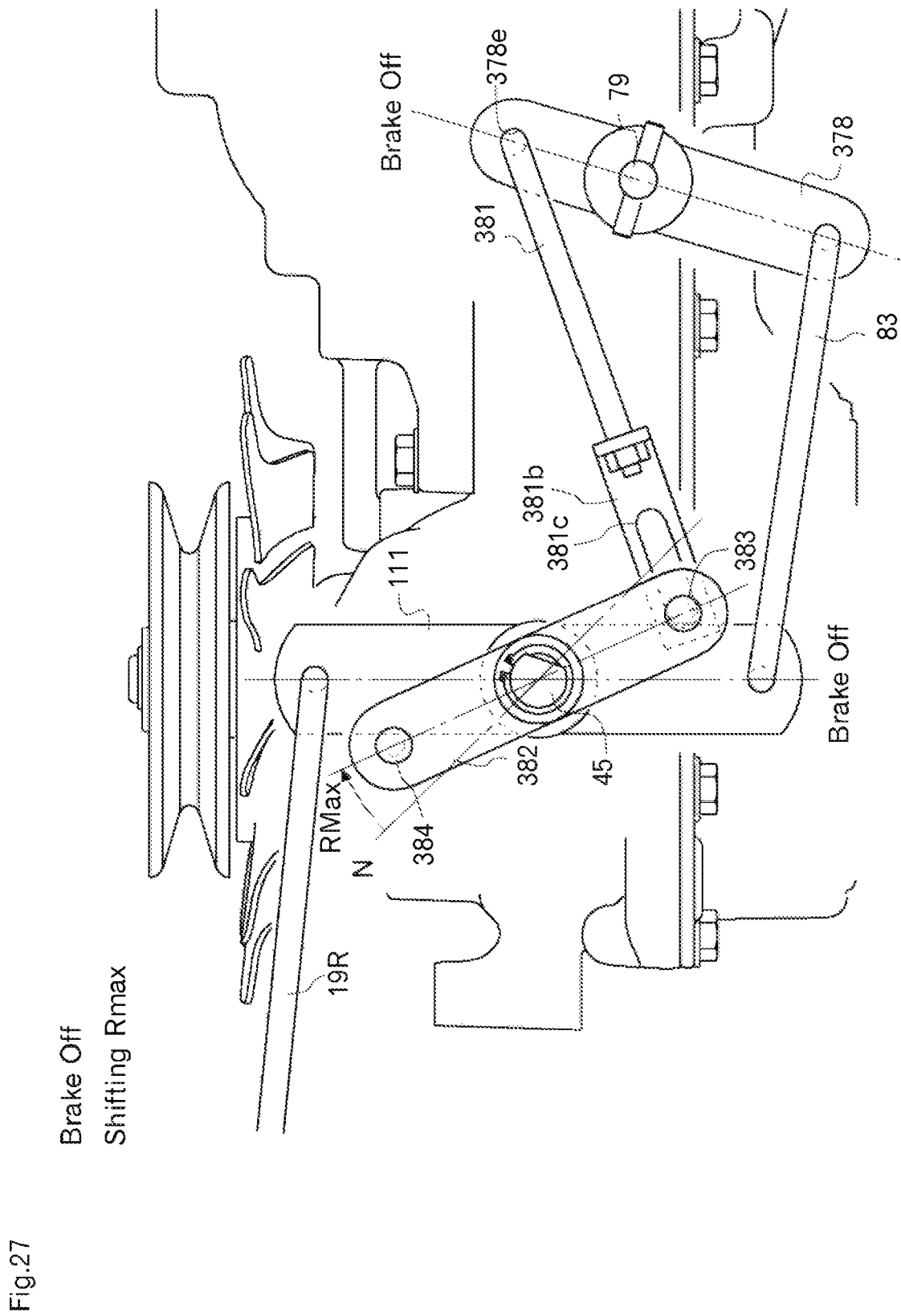
FIG. 27 is a left side view of the parking brake arm and the relay arm when the parking brake pedal is in an off state and the left and right control levers are in the maximum reverse position.
Figure 28:
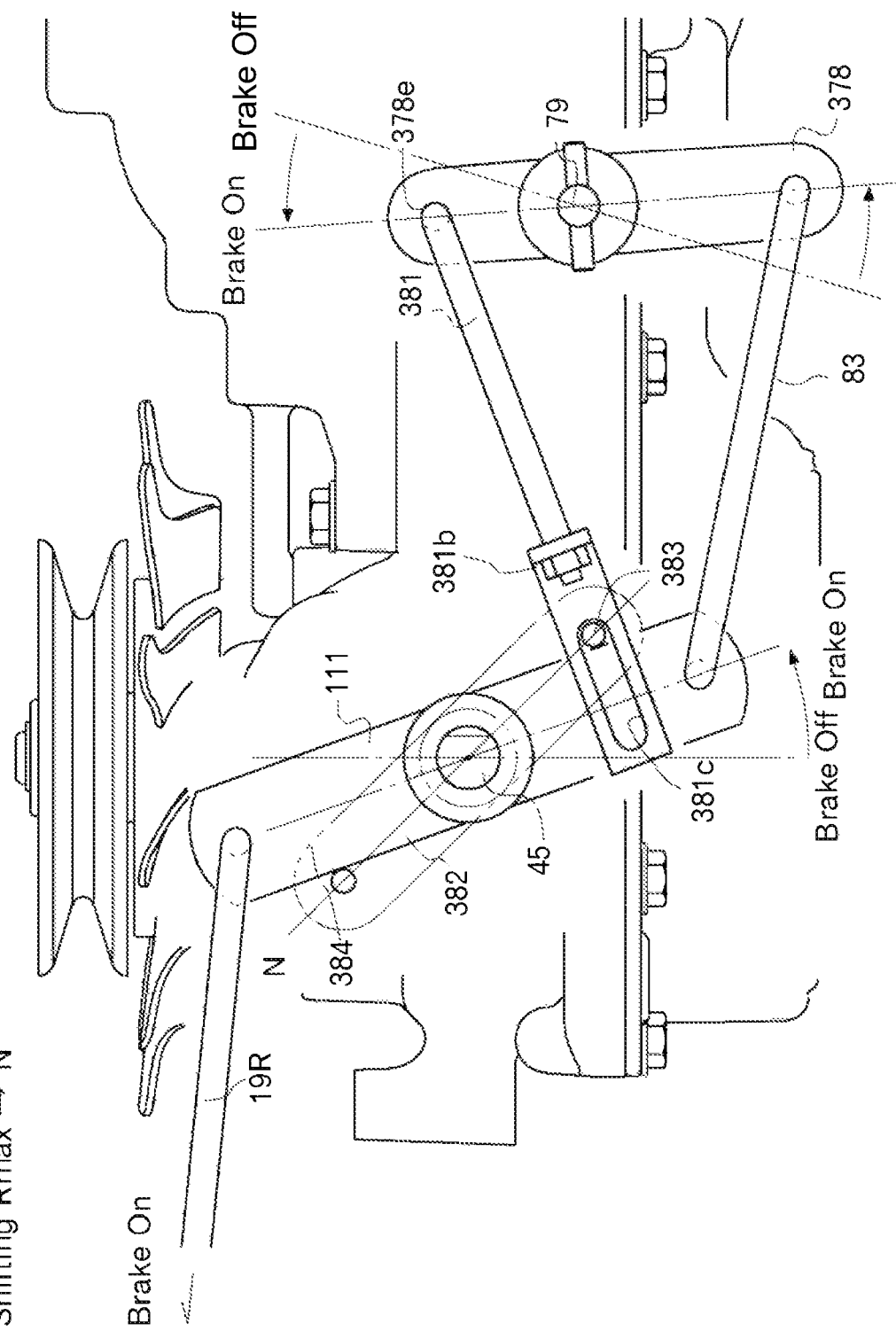
FIG. 28 is a left side view of the parking brake arm and the relay arm when the parking brake pedal is depressed and in an on state, and the left and right control levers move from the maximum reverse position to the neutral position.

As shown in FIG. 27, the configuration is set such that when the parking brake pedal 64 is not depressed and the left and right control levers 60R and 60L are operated from the neutral position "N" to the reverse side, the speed control interlocking arm 382 tilts clockwise from the state shown in FIG. 26 via the trunnion shaft 45 to move in an arc so that the first and second locking pins 383 and 384 approach the relay arm 111 around the trunnion shaft 45, and when it moves to the maximum reverse position "Rmax", the first locking pin 383 of the speed control interlocking arm 382 comes into contact with the rear face of the relay arm 111, and the second locking pin 384 comes into contact with the front face of the relay arm 111. As shown in FIG. 28 in a case where the left and right control levers 60R and 60L are in the maximum reverse position "Rmax", when the parking brake pedal 64 is depressed, the link rod 19R is moved forward, so that the relay arm 111 moves counterclockwise.

When the relay arm 111 moves counterclockwise, the first and second locking pins 383 and 384 that come into contact with the front and rear faces of the relay arm 111 are pushed, and the speed control interlocking arm 382 rotates counterclockwise and return to the neutral position.

Figure 29:
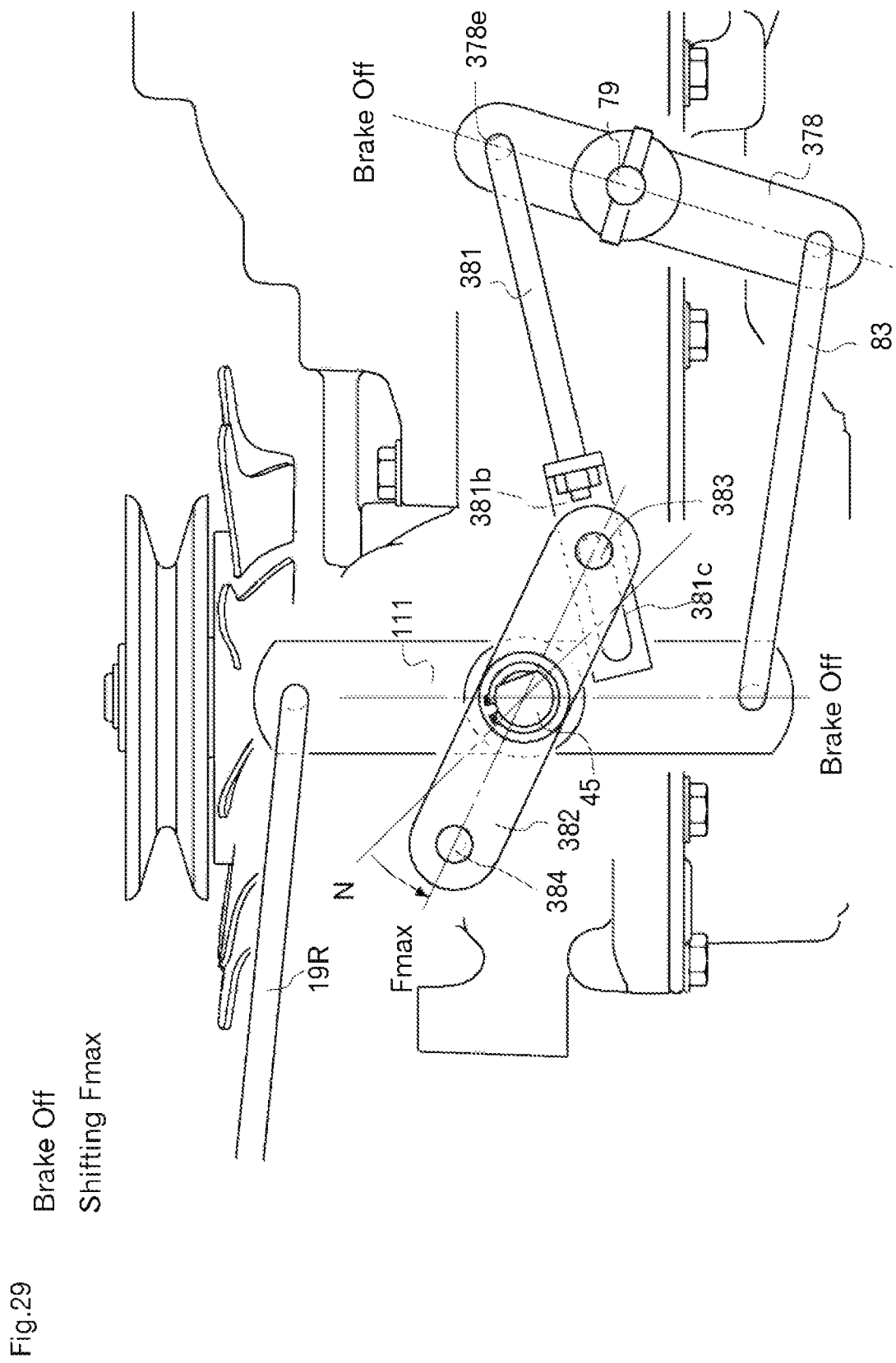
FIG. 29 is a left side view of the parking brake arm and the relay arm when the parking brake pedal is in an off state and the left and right control levers are in the maximum reverse forward position.
Figure 30:
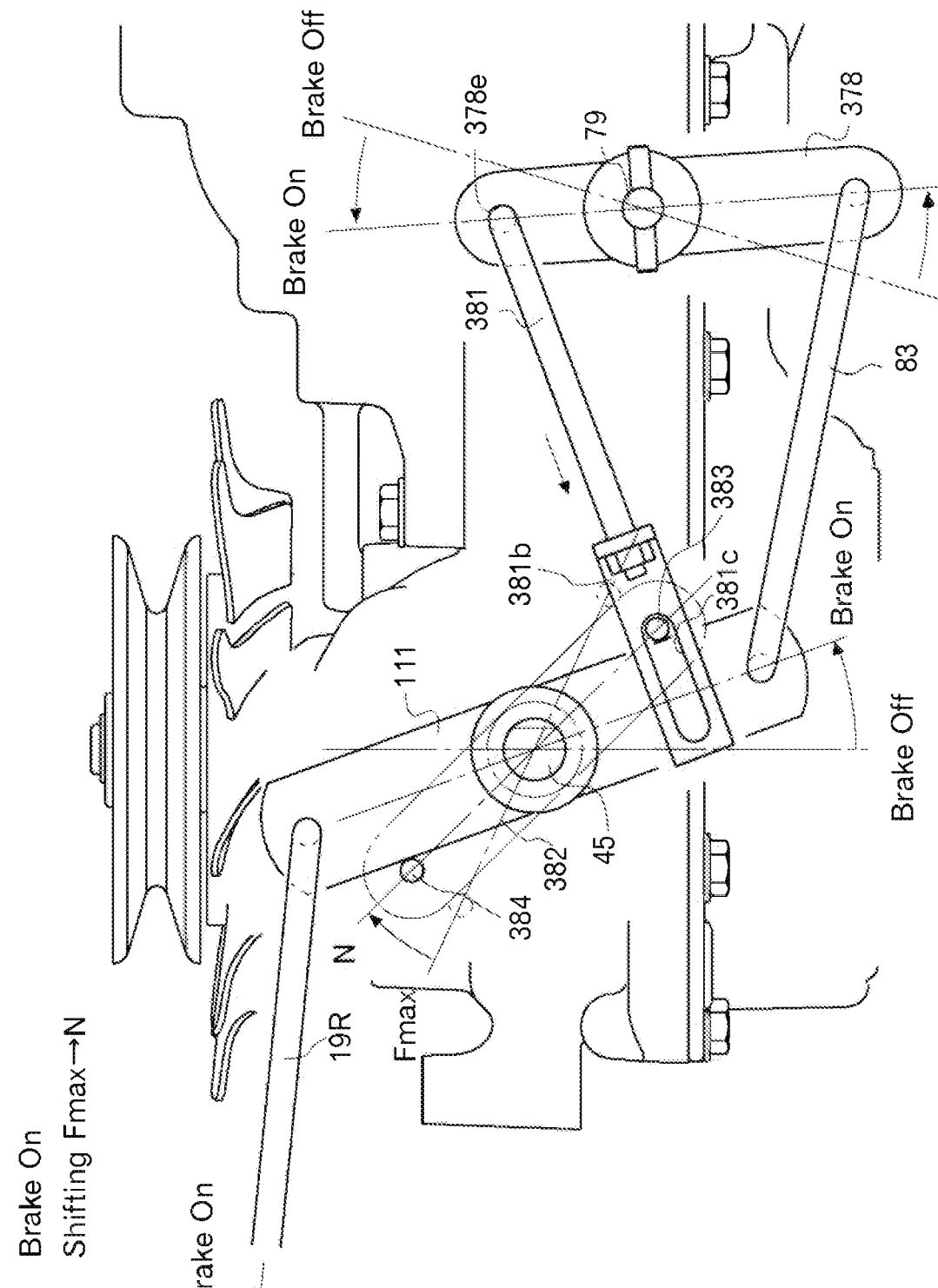
FIG. 30 is a left side view of the parking brake arm and the relay arm when the parking brake pedal is in an on state and the left and right control levers move from the maximum forward position to the neutral position.

As shown in FIG. 29, when the parking brake pedal 68 is not depressed and the left and right control levers 60R and 60L are operated from the neutral position "N" to the forward side, the speed control interlocking arm 382 tilts counterclockwise from the state shown in FIG. 26 via the trunnion shaft 45. The configuration is set such that the first and second locking pins 383 and 384 makes a circular motion so as to be away from the relay arm 111 around the trunnion shaft 45, and moves to the maximum forward position "Fmax", and the first locking pin 383 comes into contact with the rear end of the lost motion hole 381c. As shown in FIG. 30, in a case where the left and right control levers 60R and 60L are in the maximum forward position "Fmax", when the parking brake pedal 68 is depressed, the link rod 19R is moved forward, so that the relay arm 111 moves counterclockwise.

The link rod 83 moves rearward when the relay arm 111 moves counterclockwise. The rearward movement of the link rod 83 causes the lower end of the parking brake arm 78 to move rearward, causing the brake operating shaft 79 to rotate counterclockwise in the left side view. Further, the upper end of the parking brake arm 78 moves forward, and the push link 381 moves forward. The second locking pin 384, which is in contact with the rear end of the lost motion hole 381c of the push link 381, is pushed forward by the push link 381, and the speed control interlocking arm 382 is rotated clockwise and return to the neutral position.

With this configuration, when the left and right control levers 60R and 60L are in the reverse or forward position and the parking brake pedal 68 is depressed, that is, when the relay arm 111 moves counterclockwise, the speed control interlocking arm 382 is moved to the neutral position, so that the left and right control levers 60R and 60L return to the neutral position. For this reason, even when the operator forgets to return the left and right control levers 60R and 60L accurately to the neutral position, the left and right control levers 60R and 60L can be reliably returned to the neutral position simply by depressing the parking brake pedal, so that it is possible to prevent the vehicle from moving unexpectedly when restarting the engine.

It is further understood by those skilled in the art that the foregoing description is given to preferred embodiments of the disclosed apparatus and that various changes and modifications may be made without departing from the scope thereof defined by the following claims.

What is claimed is:

1. A transaxle with a brake comprising:
a transaxle casing;
an axle supported by the transaxle casing;
a continuously variable transmission disposed in the transaxle casing having a transmission operating shaft that extends beyond the transaxle casing;
a braking device that is disposed in the transaxle casing and that locks a rotation of the axle;
a speed control arm that is disposed on the transmission operating shaft so as not to rotate relative to the transmission operating shaft, wherein movement of the speed control arm controls a speed and direction of the continuously variable transmission;
a brake arm that is disposed on an operating shaft of the braking device; and
a relay arm that is disposed on the transmission operating shaft so as to be rotatable with respect to the transmission operating shaft,
wherein the relay arm has one end connected to the brake arm via a link rod and has another end connected to a link mechanism for lock operation input.

2. A vehicle, comprising:
a pair of transaxles with a brake according to claim 1, wherein one of the pair of transaxles is a left transaxle and the other of the pair of transaxles is a right transaxle; and
a pair of left and right manipulation lever devices,
wherein each of the left and right manipulation lever devices includes a transmission manipulation unit that is capable of moving in a front-rear direction of the vehicle that is configured to determine a stop of the axle in the corresponding transaxle and is configured to determine a traveling direction or a speed of the axle in the corresponding transaxle,
wherein each of the left and right manipulation lever devices includes a lock operation unit that is capable of moving in a left to right direction with respect to the vehicle to lock and unlock the axle in the corresponding transaxle when the manipulation lever device is in a neutral position, and
wherein the speed control arm is connected to the transmission manipulation unit, and the relay arm is connected to the lock operation unit.

3. A vehicle, comprising:
a pair of transaxles with a brake according to claim 1, wherein one of the pair of transaxles is a left transaxle and the other of the pair of transaxles is a right transaxle;
a pair of left and right manipulation lever devices; and
a single lock pedal device,
wherein a speed control lever is connected to the manipulation lever device and the relay arm is connected to the lock pedal device.

4. A transaxle comprising:
a transaxle casing;
an axle supported by the transaxle casing;
a transmission disposed in the transaxle casing;
a braking device that is disposed in the transaxle casing and is capable of locking the axle;
an operation unit that controls the transmission;
a transmission operating shaft that controls the transmission;
a brake arm of the braking device, the brake arm being capable of causing the braking device to lock and unlock the axle;
a relay arm that is disposed on the transmission operating shaft so as to be rotatable relative to the transmission operating shaft, wherein the relay arm has one end connected to the brake arm via a link mechanism and the other end connected to the operation unit via a link mechanism; and
a speed control interlocking arm that is disposed on the transmission operating shaft so as to be juxtaposed with the relay arm, wherein the speed control interlocking arm is configured such that when the relay arm moves in a direction of locking the axle, a force based on that movement is transmitted to the speed control interlocking arm through the transmission operating shaft and moves the speed control interlocking arm moves the transmission to a neutral position.

5. The transaxle according to claim 4, wherein the brake arm includes a first end and a second end, and wherein the speed control interlocking arm is connected to the first end of the brake arm via a brake interlocking link mechanism, and the relay arm is connected to the second end of the brake arm via a link.

6. The transaxle according to claim 5, wherein the brake interlocking link mechanism has a lost motion hole,
wherein the speed control interlocking arm has a locking pin, and
wherein the locking pin is engaged with the lost motion hole.

* * * * *